US012119693B1

(12) United States Patent
Thiel et al.

(10) Patent No.: US 12,119,693 B1
(45) Date of Patent: *Oct. 15, 2024

(54) BATTERY HARVESTING ADAPTER

(71) Applicant: LAT Enterprises, Inc., Raleigh, NC (US)

(72) Inventors: Laura Thiel, Raleigh, NC (US); Giancarlo Urzi, Raleigh, NC (US); Ronen Hananis, Netanya (IL)

(73) Assignee: LAT Enterprises, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,561

(22) Filed: Jul. 26, 2023

Related U.S. Application Data

(63) Continuation of application No. 17/950,695, filed on Sep. 22, 2022, now Pat. No. 11,715,966, which is a continuation of application No. 17/665,115, filed on Feb. 4, 2022, now Pat. No. 11,456,609.

(51) Int. Cl.
*H02J 7/00* (2006.01)
*H01R 13/625* (2006.01)
*H01R 33/94* (2006.01)

(52) U.S. Cl.
CPC .......... *H02J 7/0045* (2013.01); *H01R 13/625* (2013.01); *H01R 33/94* (2013.01); *H02J 7/0063* (2013.01)

(58) Field of Classification Search
CPC .... H02J 7/0045; H02J 7/0063; H01R 13/625; H01R 33/94
See application file for complete search history.

(56) References Cited

U.S. PATENT DOCUMENTS

| | | | |
|---|---|---|---|
| 6,459,176 B1 | 10/2002 | Brockel et al. | |
| 6,666,701 B1 | 12/2003 | Burkhardt et al. | |
| 7,597,570 B2 | 10/2009 | So | |
| 8,232,769 B2 | 7/2012 | Paczkowski | |
| 8,305,037 B2 | 11/2012 | Poh et al. | |
| 9,240,651 B2 | 1/2016 | Thiel | |
| 9,276,424 B2 | 3/2016 | Paczkowski et al. | |
| 10,270,281 B1 | 4/2019 | Priest et al. | |
| 10,490,962 B2 | 11/2019 | Badie et al. | |
| 10,879,712 B2 | 12/2020 | Kissel et al. | |
| 10,922,094 B2 | 2/2021 | Morris et al. | |
| 11,456,609 B1 * | 9/2022 | Thiel ..................... H01R 33/94 |
| 11,715,966 B1 * | 8/2023 | Thiel ..................... H02J 7/0063 439/500 |
| 2008/0090452 A1 | 4/2008 | Rose et al. | |

FOREIGN PATENT DOCUMENTS

| | | | | |
|---|---|---|---|---|
| CN | 203746984 U | * | 7/2014 | |
| DE | 202012009781 U1 | * | 1/2013 | ......... H01R 13/5213 |
| JP | S62270922 A | | 11/1987 | |
| JP | 3654819 B2 | | 6/2005 | |

* cited by examiner

Primary Examiner — Jean F Duverne
(74) Attorney, Agent, or Firm — NEO IP

(57) ABSTRACT

The present invention includes a battery harvesting adapter configured to connect to a plurality of batteries operable to power a plurality of radios. The plurality of radios includes a PRC-148, a PRC-152, and a PRC-163 radio. The battery harvesting adapter is further configured to capture power from a battery and transfer the power to a radio, a battery, a portable power case, a DC-DC converter, and other equipment.

19 Claims, 28 Drawing Sheets

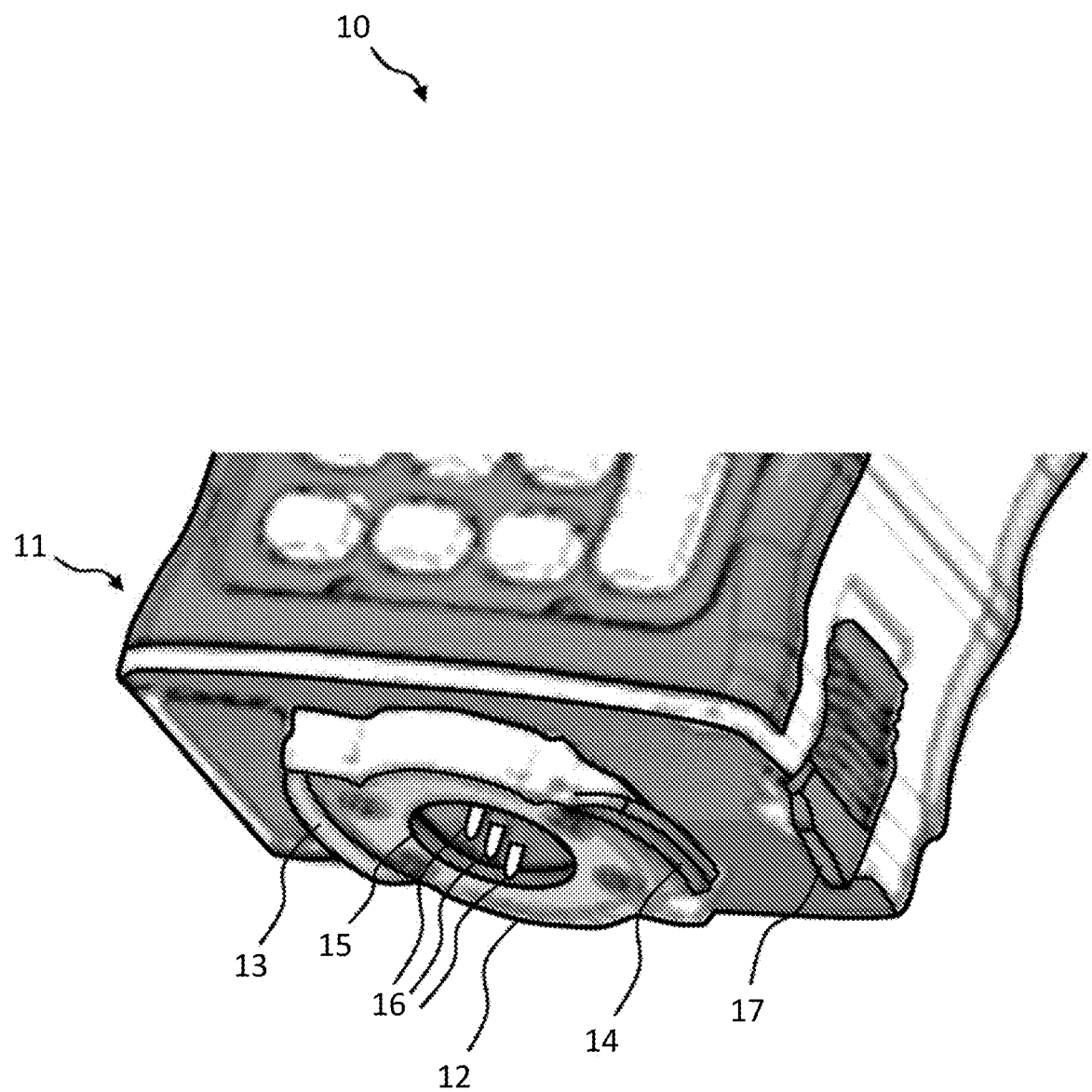
PRIOR ART FIG. 1A

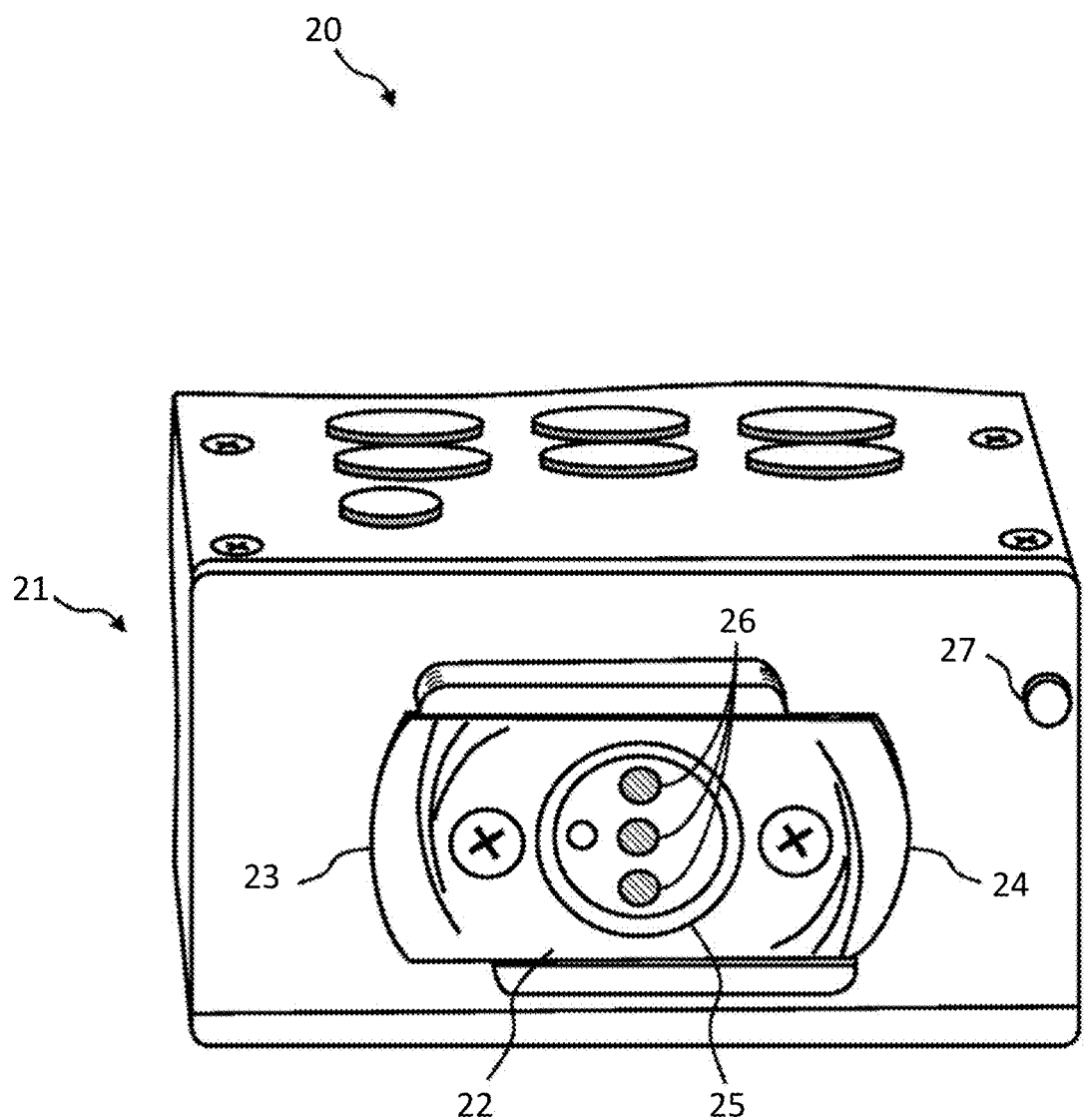
PRIOR ART FIG. 1B

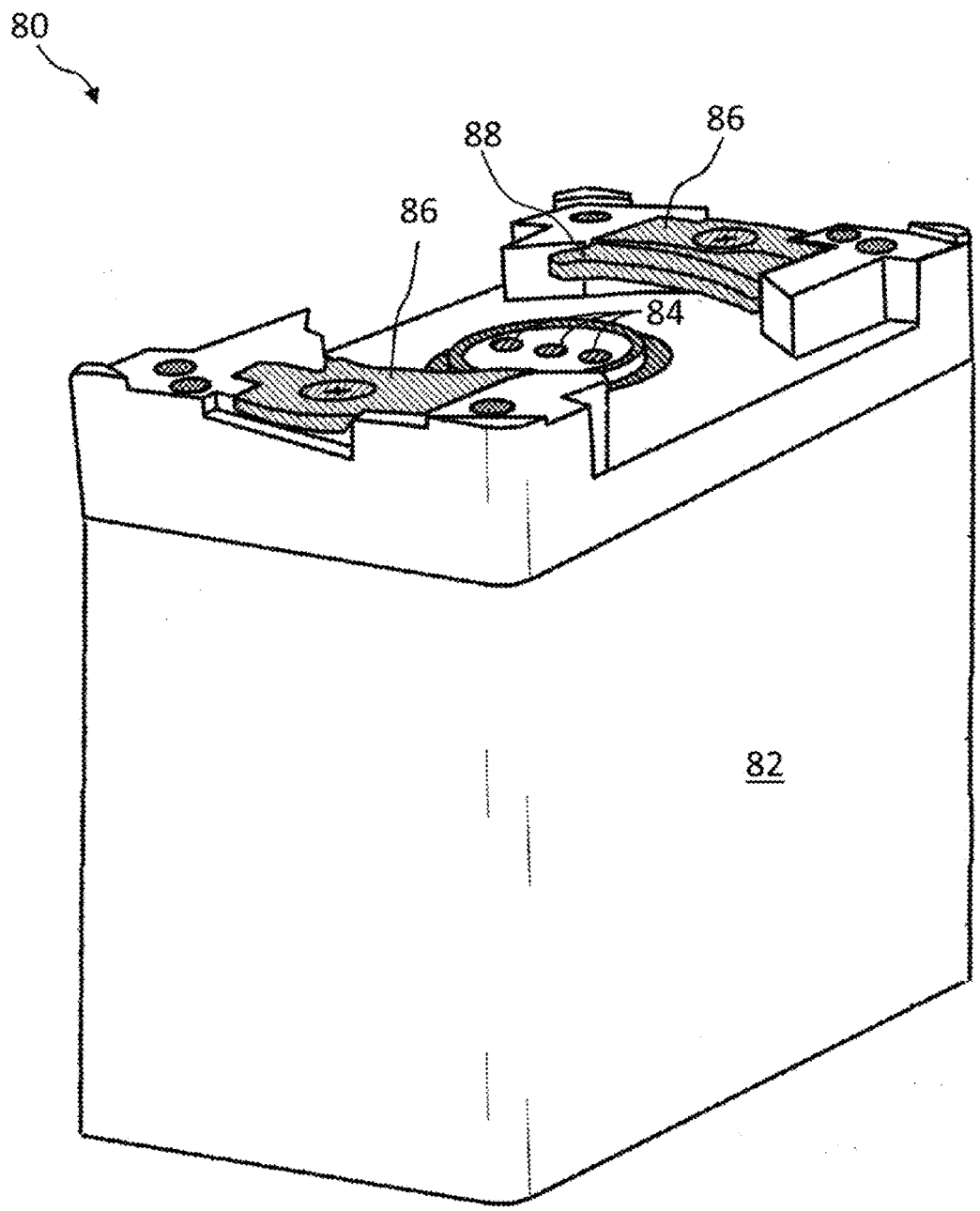
PRIOR ART FIG. 2

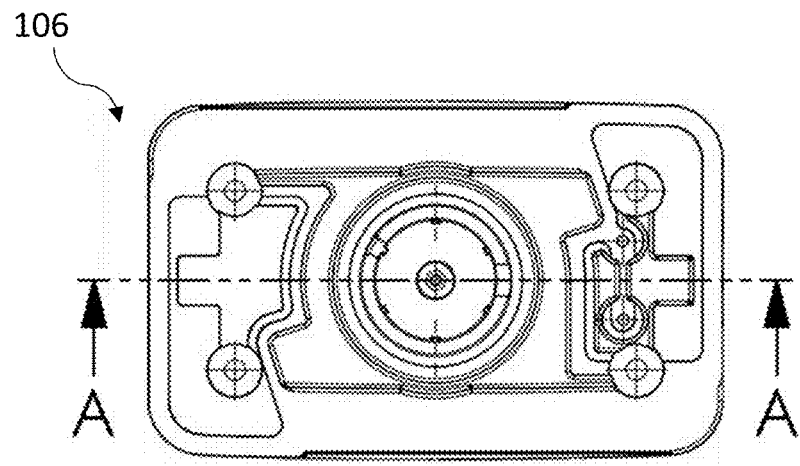
FIG. 7E
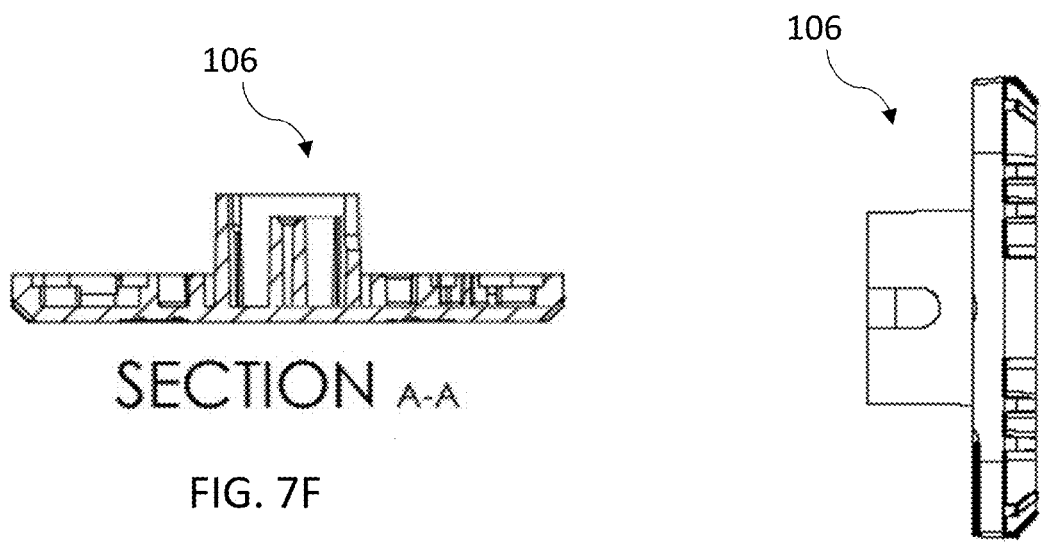
SECTION A-A
FIG. 7F
FIG. 7G

SECTION D-D

SECTION F-F

SECTION G-G

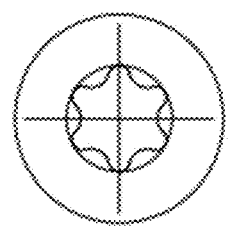
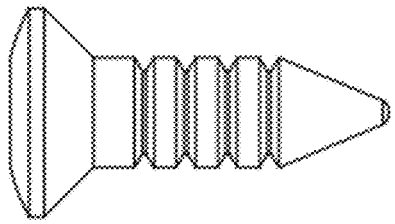
FIG. 15A  FIG. 15B
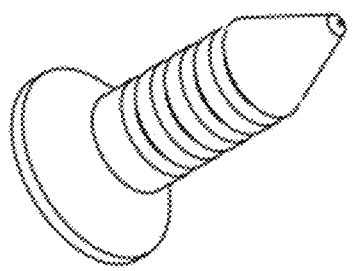
FIG. 15C

BATTERY HARVESTING ADAPTER

CROSS REFERENCES TO RELATED APPLICATIONS

This application is related to and claims priority from the following U.S. patents and patent applications. This application is a continuation of U.S. application Ser. No. 17/950,695, filed Sep. 22, 2022, which is a continuation of U.S. application Ser. No. 17/665,115, filed Feb. 4, 2022, each of which is incorporated herein by reference in its entirety.

BACKGROUND OF THE INVENTION

1. Field of the Invention

The present invention relates to a battery harvesting adapter and more specifically to a battery harvesting adapter for military batteries.

2. Description of the Prior Art

It is generally known in the prior art to provide battery adapters. It is also known in the prior art to provide batteries for radios that twist onto (i.e., rotationally engage with) the radio. Examples of these batteries include a portable radio communications (PRC)-148 radio battery and a PRC-152 radio battery.

U.S. Pat. No. 10,490,962 for minimum rotation bayonet electrical connector by inventors Badie, et al., filed Nov. 9, 2018 and issued Nov. 26, 2019, is directed to devices, systems, and methods for providing a bayonet electrical connector for connecting electrical components, such as for securely connecting a battery or other device to a charger, a bayonet based power source, or for providing a similar type connection for another device such as a radio, using minimal space requirements.

U.S. Pat. No. 6,666,701 for bayonet-type electrical connector assembly by inventors Burkhardt, et al., filed Jul. 22, 2002 and issued Dec. 23, 2003, is directed to a bayonet-type connector assembly for releasably securing a first connector half to a second connector half along a connection axis by simple rotation of a bayonet nut. Each connector half includes a plurality of electrical contacts. The bayonet nut encircles the second connector half. Rotation of the nut to a closed position causes a thread segment on the nut to engage corresponding grooved segments formed in the first connector half, to mate the connector halves, enabling electrical contact between the connector halves. Rotation of the bayonet nut also slides a slidable portion, i.e., a nut cam, beneath a cam of the second connector half to prevent axial separation of the two connector halves. The connector assembly further includes a detent positioned to engage a securement on one of the cams to releasably lock the nut in the closed position.

U.S. Pat. No. 10,879,712 for battery adaptor by inventors Kissel, et al., filed Feb. 9, 2019 and issued Dec. 29, 2020, is directed to an adapter device for coupling one or more batteries to a remote powered device. The adapter device includes a housing that accommodates a portion of a locking mechanism and a power system. The locking mechanism couples the one or more batteries to the adapter device. The power system facilitates power transfer between the one or more batteries and the remote powered device.

US Patent Publication No. 2008/0090452 for battery adapter by inventors Rose, et al., filed May 17, 2007 and published Apr. 17, 2008, is directed to a battery adapter comprising a body having a first portion and a second portion, wherein the first portion is configured so as to mechanically and electrically connect to an electrical device, and the second portion is configured so as to mechanically and electrically connect to a battery, wherein the electrical device and the battery are characterized by different form-fit factors; wherein the first portion is electrically connected to the second portion so that a battery connected to the second portion can power an electrical device connected to the first portion. A battery adapter comprising a body having a first portion and a second portion, wherein the first portion is configured so as to mechanically and electrically connect to an electrical device, and the second portion is configured so as to mechanically and electrically connect to a battery; wherein the first portion is electrically connected to the second portion so that a battery connected to the second portion can power an electrical device connected to the first portion; and further wherein the battery adapter further comprises the logic circuitry associated with a smart battery, in order that the battery adapter can provide smart battery functionality when the battery comprises a non-smart battery.

U.S. Pat. No. 9,276,424 for adapter for foldable battery charger by inventors Paczkowski, et al., filed Jan. 15, 2014 and issued Mar. 1, 2016, is directed to an adapter for a portable battery charging apparatus having two or more battery charging interfaces on separate panels. Wires electrically couple the battery charging apparatuses to a charger unit. The wires are routed for flexibility to fold and unfold the panels. The adapter is configured to nest between two panels of the battery charging apparatus when the panels are stacked together in a compact folded state.

U.S. Pat. No. 8,305,037 for battery powered device by inventors Poh, et al., filed Oct. 7, 2009 and issued Nov. 6, 2012, is directed to a battery powered device including a base unit, a connector coupled to the base unit for controlling an electronic device, and a retaining cap. The connector further comprises one or more contact points. The retaining cap further comprises a cell for powering the base unit, one or more electrical contact terminals for coupling the cell and the one or more contact points for providing an electrical connection to the base unit, and a locking mechanism for locking the retaining cap to the base unit and for sealing the electrical connection to the base unit. Further, the coupling of the base unit and connector, and locking of the base unit and the retaining cap provides powering of the battery powered device.

U.S. Pat. No. 6,459,176 for survival radio battery adapters by inventors Brockel, et al., filed Nov. 28, 2000 and issued Oct. 1, 2002, is directed to a survival radio battery adapter for survival equipment to operate with commercially available rechargeable batteries sealed in a rugged, watertight battery compartment. The survival radio battery adapter comprises a battery compartment, an adapter coupler, an adapter means having surge protection, voltage regulator and voltage conversion devices, with the adapter coupler being connected to the battery compartment and the battery compartment containing sufficient commercially available rechargeable batteries. The battery compartment is configured to provide a watertight seal when closed. The preferred embodiment is an AN/PRC-90 survival radio battery adapter. In another embodiment, this invention provides a survival radio battery adapter for the AN/PRC-112 D survival radio comprising a battery compartment connected directly to the survival radio, with a surge protection device being included in the battery compartment, and other power management devices already included in the survival radio so that it operates with commercially available rechargeable batteries. This invention also provides battery adapters for survivability equipment.

U.S. Pat. No. 7,597,570 for universal battery charger and/or power adaptor by inventor So, filed Aug. 16, 2007 and issued Oct. 6, 2009, is directed to a universal power adapter that has a choice of configurations for use in different countries and with different items of electronic equipment. A plug base for pivot connection with the adapter body has conducting pins for connection with an electrical socket and corresponding electrical terminals connected electrically to the pins. A rotational safety cover is provided to shield the electrical terminals and avoid unintentional contact. The cover has openings permitting access to the terminals when the cover is rotated. The body has a lug for engaging the cover to rotate the cover when the body is secured rotatably to the base. A power cord extends from the body to a mating socket and detachable adaptor tips. A voltage selector switch for selecting voltage has a semi light transmissive indicator disk with a light beneath the disk indicating the selected output voltage and operational status of the adapter.

U.S. Pat. No. 8,232,769 for passive battery discharge device by inventor Paczkowski, filed Jun. 19, 2009 and issued Jul. 31, 2012, is directed to a passive battery discharge apparatus located within a cap. The cap extends over battery contacts to be discharged. The discharge apparatus includes a conductive material with specified volumetric resistivity properties that is formed into a pad. The cap is positioned over the contacts so that the pad touches and spans between the contacts to be discharged. A spring insures good contact between the pad and the battery contacts. A metal heat sink provides added thermal control. The discharge apparatus provides an economical solution to safely transport batteries that are beyond their useful service life by avoiding circuit components in favor of conductive elastomers or conductive foams.

U.S. Pat. No. 9,240,651 for universal DC power adaptor by inventor Thiel, filed Jan. 28, 2014 and issued Jan. 19, 2016, is directed to a universal DC power adaptor for a PRC-148 radio, a PRC-152 radio, and a Handheld ISR Transceiver, and a method of using same. The universal DC power adaptor includes mounting and locking features that are common to both the PRC-148 radio and the PRC-152 radio. The universal DC power adaptor further includes certain mounting and locking features that are unique to the PRC-148 radio and other mounting and locking features that are unique to the PRC-152 radio. The universal DC power adaptor also provides an output voltage suitable for both the PRC-148 and PRC-152 radios. Such features also are compatible with the Handheld ISR Transceiver, making the universal DC power adaptor compatible with the ISR Transceiver as well. Additionally, the universal DC power adaptor includes programmable control electronics.

U.S. Pat. No. 10,922,094 for universal DC power adaptor by inventors Thiel, et al., filed Dec. 4, 2020 and issued Apr. 27, 2021, is directed to a universal DC power adaptor for a PRC-148 radio, a PRC-152 radio, a Handheld ISR Transceiver, and similar devices and a method of using the same, is disclosed. The universal DC power adaptor includes mounting and locking features that are common to both the PRC-148 radio and the PRC-152 radio. The universal DC power adaptor further includes certain mounting and locking features that are unique to the PRC-148 radio and other mounting and locking features that are unique to the PRC-152 radio. The universal DC power adaptor also provides an output voltage suitable for both the PRC-148 and PRC-152 radios. Such features also are compatible with the Handheld ISR Transceiver, making the universal DC power adaptor compatible with the ISR Transceiver as well. Additionally, the universal DC power adaptor includes programmable control electronics.

SUMMARY OF THE INVENTION

The present invention relates to a battery harvesting adapter for military batteries.

It is an object of this invention to harvest energy from military batteries and provide power to equipment.

In one embodiment, the present invention provides an apparatus operable to engage with a device including a housing, and at least one negative contact plate attached to the housing, wherein each of the at least one negative contact plate has a first wing and a second wing, wherein the at least one negative contact plate is constructed and configured to rotate to engage the device, wherein the device includes a first contact portion operable to contact the first wing and a second contact portion operable to contact the second wing, and wherein the at least one negative contact plate is constructed and configured to contact the first contact portion and the second contact portion without rotating the housing and without rotating the device.

In another embodiment, the present invention provides a bayonet connector including a negative contact plate, a first wing extending from the negative contact plate, wherein the first wing is operable to contact a first contact portion of a battery, and a second wing extending from the negative contact plate, wherein the second wing is operable to contact a second contact portion of the battery, wherein the negative contact plate is constructed and configured to rotate to engage the battery, and wherein the negative contact plate is constructed and configured to contact the first contact portion and the second contact portion without rotating the housing and without rotating the battery.

In yet another embodiment, the present invention provides a battery harvesting adapter including a housing, a channel in the housing constructed and configured to hold a cable, at least one connector electrically connected to the cable, at least one contact pin, and a negative contact plate attached to the housing, wherein the negative contact plate has a first wing and a second wing, wherein the first wing is operable to contact a first contact portion of a battery and the second wing is operable to contact a second contact portion of the battery, wherein the at least one contact pin is operable to electrically connect to at least one battery contact, wherein the negative contact plate is constructed and configured to rotate to engage the battery, and wherein the at least one connector is operable to supply power to at least one device.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART FIG. 1A illustrates a perspective view of the base portion of a PRC-152 radio.

PRIOR ART FIG. 1B illustrates a perspective view of the base portion of a PRC-148 radio.

PRIOR ART FIG. 2 illustrates a perspective view of a battery.

FIG. 7E illustrates a bottom view of the cover of the battery harvesting adapter according to one embodiment of the present invention as shown in FIG. 7D.

FIG. 7F illustrates a cross-section view of the cover of the battery harvesting adapter according to one embodiment of the present invention as shown in FIG. 7E.

FIG. 7G illustrates another side view of the cover of the battery harvesting adapter according to one embodiment of the present invention as shown in FIG. 7F.

FIG. 15A illustrates a top view of a self-tapping screw of the battery harvesting adapter according to one embodiment of the present invention.

FIG. 15B illustrates a side view of the self-tapping screw of the battery harvesting adapter according to one embodiment of the present invention as shown in FIG. 15A.

FIG. 15C illustrates a side perspective view of the self-tapping screw of the battery harvesting adapter according to one embodiment of the present invention as shown in FIG. 15B.

DETAILED DESCRIPTION

Figure 3:
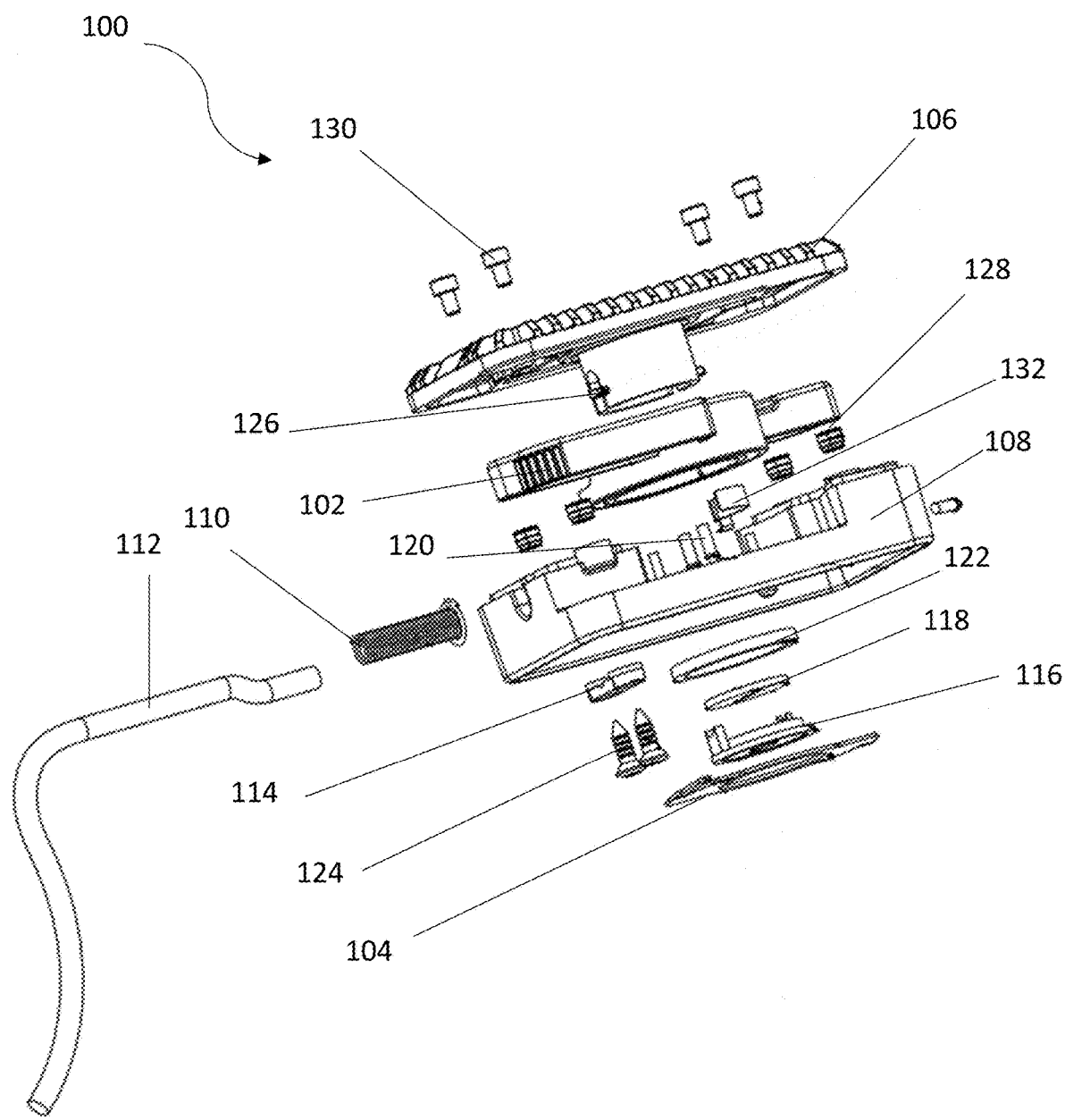
FIG. 3 illustrates an exploded view of a battery harvesting adapter according to one embodiment of the present invention.

The present invention is generally directed to a battery harvesting adapter configured to connected to a plurality of batteries.

In one embodiment, the present invention provides an apparatus operable to engage with a device including a housing, and at least one negative contact plate attached to the housing, wherein each of the at least one negative contact plate has a first wing and a second wing, wherein the at least one negative contact plate is constructed and configured to rotate to engage the device, wherein the device includes a first contact portion operable to contact the first wing and a second contact portion operable to contact the second wing, and wherein the at least one negative contact plate is constructed and configured to contact the first contact portion and the second contact portion without rotating the housing and without rotating the device. In one embodiment, the device is a battery. In one embodiment, the apparatus is a battery harvesting adapter. In one embodiment, the apparatus is a radio. In one embodiment, the apparatus is a battery charger. In one embodiment, the device is stationary.

In another embodiment, the present invention provides a bayonet connector including a negative contact plate, a first wing extending from the negative contact plate, wherein the first wing is operable to contact a first contact portion of a battery, and a second wing extending from the negative contact plate, wherein the second wing is operable to contact a second contact portion of the battery, wherein the negative contact plate is constructed and configured to rotate to engage the battery, and wherein the at least one negative contact plate is constructed and configured to contact the first contact portion and the second contact portion without rotating the housing and without rotating the battery. In one embodiment, the battery is stationary.

In yet another embodiment, the present invention provides a battery harvesting adapter including a housing, a channel in the housing constructed and configured to hold a cable, at least one connector electrically connected to the cable, at least one contact pin, and a negative contact plate attached to the housing, wherein the negative contact plate has a first wing and a second wing, wherein the first wing is operable to contact a first contact portion of a battery and the second wing is operable to contact a second contact portion of the battery, wherein the at least one contact pin is operable to electrically connect to at least one battery contact, wherein the negative contact plate is constructed and configured to rotate to engage the battery, and wherein the at least one connector is operable to supply power to at least one device. In one embodiment, the housing includes a body and/or a cover. In one embodiment, the first wing is angled towards the first contact portion and the second wing is angled towards the second contact portion. In one embodiment, a spring is provided around the cable, wherein the cable and the spring are held securely the channel in the housing such that a portion of the spring is positioned inside the housing and a portion of the spring is positioned outside the housing. In one embodiment, the battery is stationary. In one embodiment, the battery harvesting adapter further includes at least one direct current-direct current (DC-DC) converter. In one embodiment, the battery harvesting adapter further includes a locking handle connected to the negative contact plate, wherein rotating the locking handle causes the negative contact plate to rotate to engage the first contact portion and the second contact portion without rotating the housing and without rotating the battery. In one embodiment, the battery harvesting adapter further includes a cable locker constructed and configured to provide slack for the cable to turn and move when the locking handle is rotated. In one embodiment, the at least one device is a battery, a radio, a portable power case, and/or a direct current-direct current (DC-DC) converter. In one embodiment, the negative contact plate is formed of copper and/or nickel. In one embodiment, the at least one connector has an ingress protection (IP) rating of IPX6, IPX7, or IPX8. In one embodiment, the housing is formed of acrylonitrile butadiene styrene (ABS), nylon, aluminum, carbon fiber, glass fiber, polyamide, and/or polycarbonate. In one embodiment, the at least one contact pin is formed of brass, stainless steel, and/or gold.

In one embodiment, the present invention includes a battery harvesting adapter configured to attach to a portable radio communications (PRC)-148 radio battery, a PRC-152 radio battery, a PRC-161 radio battery, a PRC-163 radio battery, an ISR Transceiver battery, a SADL MicroLite (RT-1922) radio battery, a TacRover-E (TRE) radio battery, a Tactical ROVER-P (SIR 2.5) radio battery, a Coastal Defense MVR-IV video down link receiver battery, or a Persistent Systems Wave Relay MPU5 radio battery.

Portable power sources are used in, for example, military applications, law enforcement applications, aviation applications, wilderness and personal survival applications, hiking and camping applications, sporting and recreation applications, hunting applications, land surveying and expedition applications, and disaster relief efforts. For example, portable batteries exist for carrying in a backpack or for wearing on the body. These batteries, however, can be heavy and inconvenient to access and connect to devices requiring electrical power. Additionally, many corresponding battery connectors and cables can be damaged and limited in use in these various applications. The cable and connectors need to be able to be repeatedly flexed in any direction without breaking or failing to prevent damage to the cable and to provide greater functionality to the operators. Therefore, there is a need for a battery harvesting adapter with a flexible omnidirectional lead to provide greater flexibility and to protect the cable.

Additionally, batteries are deployed to military operators in a variety of environments during missions. Many of the batteries do not securely attach to the radio and other equipment being used by the military operators because a majority of the batteries are specifically designed for particular military equipment. Additionally, many radios and other equipment have unique features and unique connectors that make it difficult for military operators to power the radios and other equipment unless they have a corresponding adapter or a corresponding battery. For example, military radios have different locking features, which makes it difficult to mate to batteries and other power adapters. For example, and not limitation, see U.S. Pat. Nos. 10,992,094 and 9,240,651, each of which is incorporated herein by reference in its entirety. The inability to properly attach to equipment results in an inconsistent electrical connection between the equipment and battery and limits the rate that the equipment can be powered, if at all. In some cases, military operators are either unable to charge their equipment or they are forced to carry a plurality of adapters and/or batteries to power different equipment. This results in either the military operators being unable to perform mission critical communications because they cannot power the equipment or increasing their carrying load of their rucksacks to ensure the operator has adapters and/or batteries for the different equipment. Either result could negatively affect military operators in hostile environments, so military operators need a system and/or device operable to harvest power from the batteries to charge the equipment to maintain the mission critical communications and to reduce the amount of weight the military operator is carrying. Therefore, there is a long-felt unmet need for the ability to harvest energy from batteries to supply power to a plurality of equipment, including military radios.

Batteries that mate to military radios are often dropped (e.g., via plane, helicopter) on pallets and/or a speedball (i.e., body bag filled with supplies). Thus, these batteries are found all over the battlefield. These batteries are often used to power radios, but not all of the stored energy in the batteries is used (e.g., due to mission length) and/or the energy remaining in the batteries is not sufficient to power the radios. This remaining stored energy is often wasted. Additionally, some radios do not operate using these batteries, but the energy cannot be effectively transferred to batteries that do power those radios. What is needed is a system to remove the energy from the partially used batteries and/or incompatible batteries to provide usable energy. For example, a battery often has approximately half of its energy remaining in the battery when it is no longer operable to power a handheld radio. Advantageously, the present invention provides at least about 0.6 V from each partially used battery. In another embodiment, the present invention provides between about 0.6 V and about 7.7 V from each battery.

Additionally, the battery harvesting adapter of the present invention is designed to fit a plurality of batteries including, but not limited to, a portable radio communications (PRC)-148 radio battery, a PRC-152 radio battery, a PRC-161 radio battery, a PRC-163 radio battery, an ISR Transceiver battery, a SADL MicroLite (RT-1922) radio battery, a TacRover-E (TRE) radio battery, a Tactical ROVER-P (SIR 2.5) radio battery, a Coastal Defense MVR-IV video down link receiver battery, and a Persistent Systems Wave Relay MPU5 radio battery.

Advantageously, the battery harvesting adapter fits all of these batteries, which means that the operator only has to carry one battery harvesting adapter instead of multiple battery harvesting adapters. Carrying multiple battery harvesting adapters would result in a significant amount of additional weight in a rucksack.

None of the prior art discloses a battery harvesting adapter that is configured to securely attach to a plurality of batteries operable to power radios and provide a flexible omnidirectional lead to enable a military operator to charge their mission critical equipment.

Referring now to the drawings in general, the illustrations are for the purpose of describing one or more preferred embodiments of the invention and are not intended to limit the invention thereto.

PRIOR ART FIG. 1A illustrates a perspective view of a base portion 11 of a PRC-152 radio 10. The base portion 11 of the PRC-152 radio 10 includes a mating plate 12 that has a first end 13 and a second end 14. Further, there is an opening 15 at the center portion of the mating plate 12. Input pins 16 (e.g., three input pins 16) are arranged in the opening 15 of the mating plate 12, as shown. Additionally, a movable locking clip 17 is provided on one side of the body of the PRC-152 radio 10. Conventionally, the mating plate 12, the input pins 16, and the movable locking clip 17 are used for coupling a battery to the base portion 11 of the PRC-152 radio 10.

A battery is operable to disengage from the PRC-152 radio by disengaging the movable locking clip of the PRC-152 radio from the battery and then twisting the PRC-152 radio with respect to the battery to disengage the mating plates.

PRIOR ART FIG. 1B illustrates a perspective view of a base portion 21 of a PRC-148 radio 20. The base portion 21 of the PRC-148 radio 20 includes a mating plate 22 that has a first end 23 and a second end 24. Further, there is an opening 25 at the center portion of the mating plate 22. Input pins 26 (e.g., three input pins 26) are arranged in the opening 25 of the mating plate 22, as shown. Additionally, a spring-loaded button key 27 is provided on the bottom surface of the body of the PRC-148 radio 20. Conventionally, the mating plate 22, the input pins 26, and the spring-loaded button key 27 are operable to couple a battery (not shown) to the base portion 21 of the PRC-148 radio 20.

A battery is operable to disengage from the PRC-148 radio by twisting the PRC-148 radio with respect to the battery to disengage the mating plates and the spring-loaded button key.

Referring now to PRIOR ART FIG. 1A and PRIOR ART FIG. 1B, certain features of the PRC-152 radio 10 and of the PRC-148 radio 20 are substantially the same. For example, the cross-sectional footprint and dimensions of the base portion 11 of the PRC-152 radio 10 are substantially the same as the cross-sectional footprint and dimensions of the base portion 21 of the PRC-148 radio 20. Further, the features of the mating plate 12 of the PRC-152 radio 10 are substantially the same as the features of the mating plate 22 of the PRC-148 radio 20. Further still, with respect to the mating plate 12 of the PRC-152 radio 10 and with respect to the mating plate 22 of the PRC-148 radio 20, the number and position of the input pins 16 and the number and position of the input pins 26, respectively, are substantially the same.

However, certain other features of the PRC-152 radio 10 and the PRC-148 radio 20 are unique, i.e., not substantially the same. For example, the movable locking clip 17 on one side of the PRC-152 radio 10 is unique only to the PRC-152 radio 10. Further, the spring-loaded button key 27 on the bottom surface of the body of the PRC-148 radio 20 is unique only to the PRC-148 radio 20. The PRC-161 has a similar body to the PRC-148, and the PRC-163 has a similar body to the PRC-152.

PRIOR ART FIG. 2 illustrates a perspective view of a battery. The battery 80 includes a battery base 82, a plurality of battery contacts 84, and a plurality of contact portions 86. In the embodiment shown in PRIOR ART FIG. 2, the plurality of contact portions 86 each include a lip portion 88. Additional details about batteries, radios, and bayonet connections are included in U.S. Pat. Nos. 9,240,651; 10,992,094; and 10,490,962, each of which is incorporated herein by reference in its entirety.

A PRC-148 radio, a PRC-152 radio, a PRC-161 radio, a PRC-163 radio, an ISR Transceiver, a SADL MicroLite (RT-1922) radio, a TacRover-E (TRE) radio, a Tactical ROVER-P (SIR 2.5) radio, a Coastal Defense MVR-IV video down link receiver, or a Persistent Systems Wave Relay MPU5 radio all require twisting to remove the battery from the radio. The battery is connected to the radio (e.g., those manufactured by HARRIS, THALES, or VIASAT) via a bayonet connection. Thus, removing the battery from the radio requires a first hand to hold the radio and a second hand to hold the battery, followed by a twisting motion to remove the battery from the radio.

Therefore, the prior art generally describes a battery rotationally engaging with a device (e.g., radio, charger). See, e.g., U.S. Pat. No. 10,490,962, which is incorporated herein by reference in its entirety. Advantageously, the present invention does not require rotational engagement of the battery and/or the housing of the device to mate the battery to the device. The negative contact plate of the present invention is operable to rotate to engage a battery, allowing for electrical contact and/or physical contact. The engagement preferably provides for an electrical connection between the battery and the device. The battery and the housing of the present invention do not rotate. The present invention further includes a locking mechanism to securely attach and/or engage to a battery.

FIG. 3 illustrates an exploded view of one embodiment of the battery harvesting adapter according to one embodiment of the present invention. Preferably, in one embodiment, the battery harvesting adapter is configured to securely attach onto a battery via a locking mechanism. The battery harvesting adapter 100 includes, but is not limited to, a locking handle 102, a negative contact plate 104, a cover 106, a body 108, a spring 110, a cable 112, a cable locker 114, a printed circuit board (PCB) cover 116, a printed circuit board assembly (PCBA) 118, at least one contact pin 120, an adapter ring 122, at least one tapping screw 124, at least one hex nut 126, at least one tapered insert 128, at least one screw 130, and a metal connector 132. In one embodiment, the battery harvesting adapter further includes an injection port for injection molding. Advantageously, in a preferred embodiment, the battery harvesting adapter is configured to securely attach to a battery operable to mate to a military radio including, but not limited to, a PRC-148 radio, a PRC-152 radio, a PRC-161 radio, a PRC-163 radio, an ISR Transceiver, a SADL MicroLite (RT-1922) radio, a TacRover-E (TRE) radio, a Tactical ROVER-P (SIR 2.5) radio, a Coastal Defense MVR-IV video down link receiver, or a Persistent Systems Wave Relay MPU5 radio. For example and not limitation, the battery is operable to mate to all handheld military radios including a bayonet connection (e.g., those manufactured by HARRIS, THALES, or VIASAT).

In a preferred embodiment, the battery harvesting adapter 100 is formed of a polymer. In one embodiment, the polymer has a melting point of at least 500° F. In another embodiment, the polymer has a melting point of at least 400° F. Advantageously, the polymer has a melting point high enough to prevent heat from the battery, other equipment, and/or the environment from melting the battery harvesting adapter. In one embodiment, the battery harvesting adapter includes a material formed of acrylonitrile butadiene styrene (ABS), nylon, aluminum, carbon fiber, glass fiber, and/or polycarbonate. In one embodiment, the battery harvesting adapter is formed of a glass fiber reinforced resin. In one embodiment, the glass fiber reinforced resin is a heat stabilized, black polyamide 66 resin. In one embodiment, the glass fiber reinforced resin is ZYTEL® 70G33L NC010. In another embodiment, the battery harvesting adapter is configured to have a stress breaking point of about 200 MPa, a strain at break of about 3.5%, a flexural modulus of about 9300 MPa, a flexural strength of about 290 MPa, and/or a tensile modulus of about 10,500 MPa.

The battery harvesting adapter is preferably formed using injection molding. In one embodiment, the cover, the body, and/or the locking handle are each a unitary and integrally formed piece of plastic formed via injection molding. In one embodiment, the battery harvesting adapter is formed using materials including, but not limited to, aluminum, titanium, nickel, steel, gold, platinum, copper, silver, palladium, rhodium, magnesium, microlattice metals, composite metal foams, a plastic material, a carbon fiber (e.g., acrylonitrile butadiene styrene (ABS) infused carbon fiber), and combinations thereof. Materials which provide other advantages such as bullet resistance (e.g., composite metal foams) are also used for the battery harvesting adapter in one embodiment of the present invention. The plastic material includes, but is not limited to, a polycarbonate, a styrene (e.g., acrylonitrile butadiene styrene (ABS)), polyvinyl chloride, acrylic, or a combination thereof. In a preferred embodiment, the plastic material includes a polycarbonate and a styrene (e.g., ABS). In yet another embodiment, the plastic material is CYCOLOY CX7240 or CYCOLOY C6600. In another embodiment, the plastic material is BAYBLEND FR-110. The plastic material is preferably an injection moldable plastic material. In one embodiment, the plastic material is non-chlorinated and/or non-brominated. In a preferred embodiment, the plastic material is flame retardant.

In one embodiment, the battery harvesting adapter is a solid color (e.g., black, blue, brown, tan, green, white). In one embodiment, the battery harvesting adapter is a solid color that matches an original equipment manufacturer (OEM) battery. In another embodiment, the battery harvesting adapter is a camouflage pattern. Representative camouflages include, but are not limited to, universal camouflage pattern (UCP), also known as ACUPAT or ARPAT or Army Combat Uniform; MultiCam, also known as Operation Enduring Freedom Camouflage Pattern (OCP); Universal Camouflage Patter-Delta (UCP-Delta); Airman Battle Uniform (ABU); Navy Working Uniform (NWU), including variants, such as, blue-grey, desert (Type II), and woodland (Type III); MARPAT, also known as Marine Corps Combat Utility Uniform, including woodland, desert, and winter/snow variants; Disruptive Overwhite Snow digital camouflage, and Tactical Assault Camouflage (TACAM).

Figure 4A:
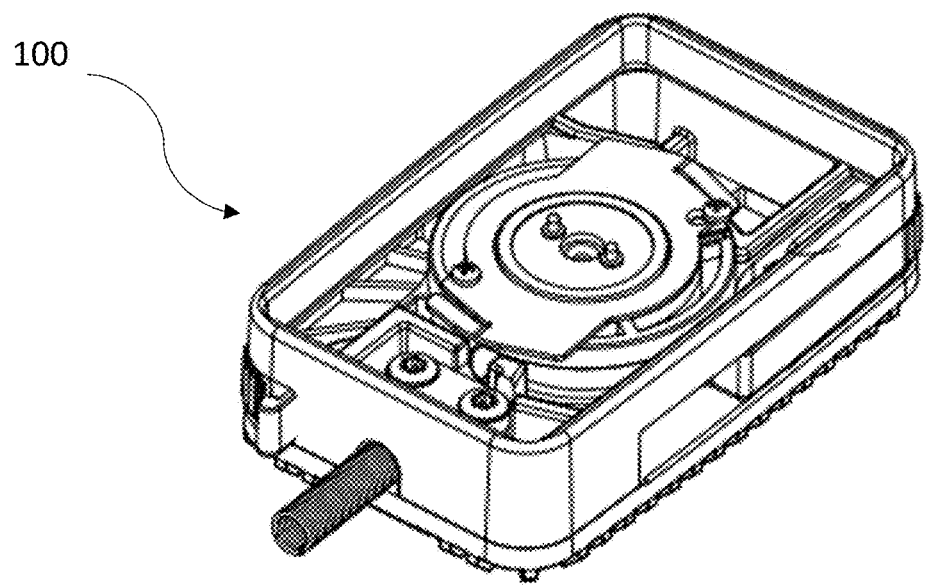
FIG. 4A illustrates a bottom perspective view of a battery harvesting adapter according to one embodiment of the present invention.
Figure 4B:
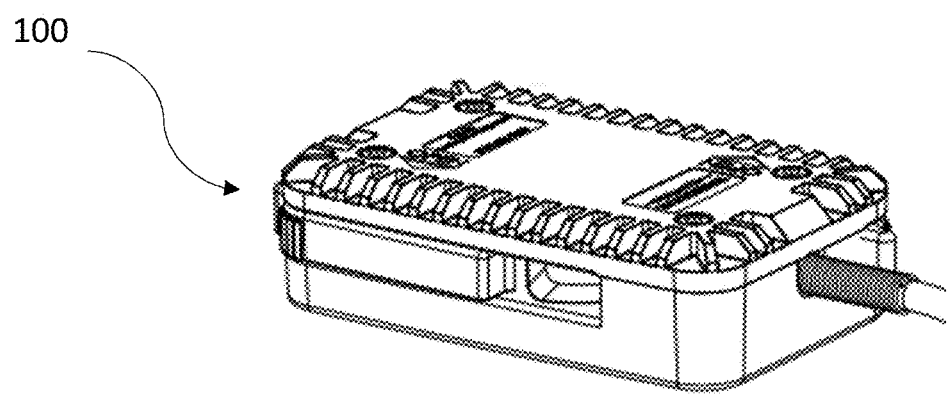
FIG. 4B illustrates a side perspective view of the battery harvesting adapter according to one embodiment of the present invention as shown in FIG. 4A.

FIGS. 4A-4B illustrate various perspectives of the battery harvesting adapter 100 according to one embodiment of the present invention. FIG. 4A illustrates a bottom perspective view of the battery harvesting adapter 100 according to one embodiment of the present invention. FIG. 4B illustrates a side perspective view of the battery harvesting adapter 100 according to one embodiment of the present invention as shown in FIG. 4A.

Figure 4C:
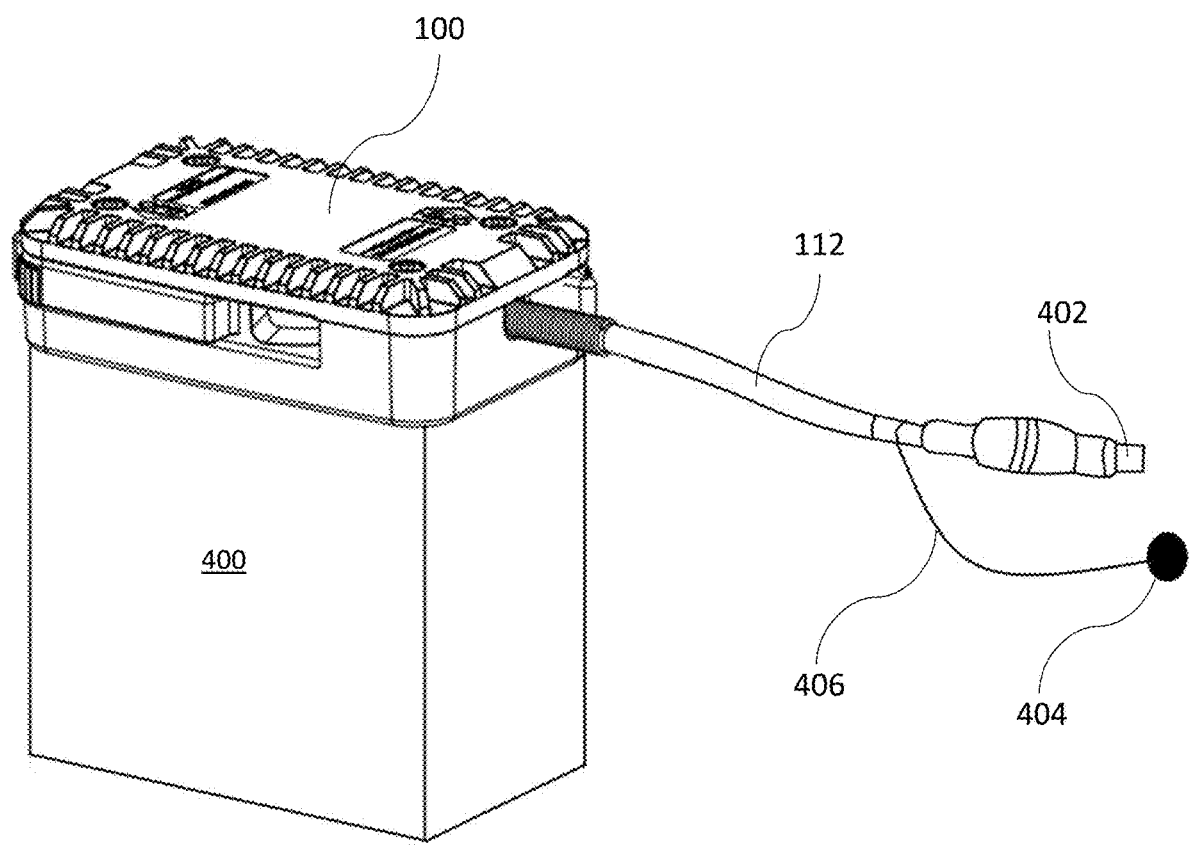
FIG. 4C illustrates one embodiment of the battery harvesting adapter attached to a battery.

FIG. 4C illustrates one embodiment of the battery harvesting adapter 100 attached to a battery 400. The battery harvesting adapter 100 is shown with an output connector 402 attached to the cable 112. A dust cap 404 is attached via a lanyard or loop 406 to the cable 112. The dust cap is operable to protect the output connector 402 from external elements (e.g., dust, water).

In a preferred embodiment, the battery harvesting adapter has a housing that protects the electrical components (e.g., of the battery, the battery harvesting adapter) from external elements. The battery harvesting adapter preferably extends over a top of the battery and each sidewall of the battery, sealing the battery and the battery harvesting adapter from external elementals. In one embodiment, the housing includes a body and/or a cover.

Figure 5A:
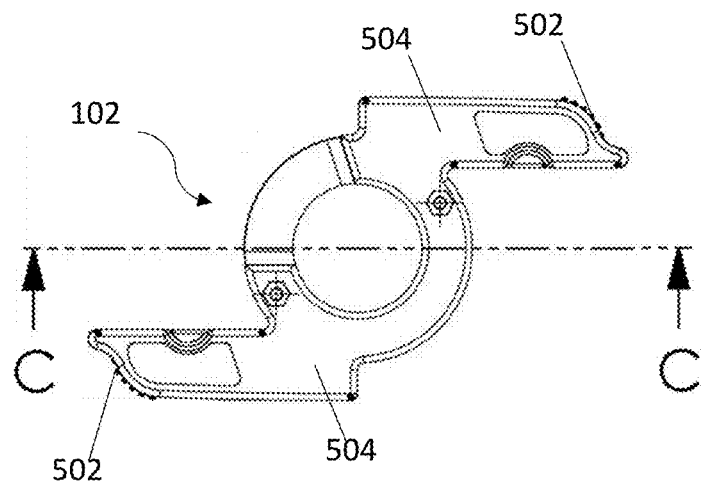
FIG. 5A illustrates a top view of a locking handle of a battery harvesting adapter according to one embodiment of the present invention.
Figure 5B:
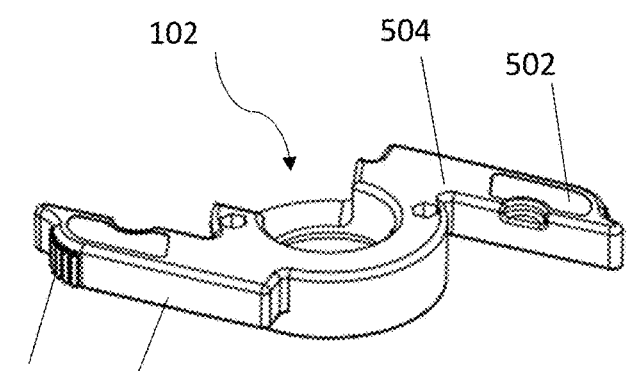
FIG. 5B illustrates a side perspective view of the locking handle of the battery harvesting adapter according to one embodiment of the present invention as shown in FIG. 5A.
Figure 5C:
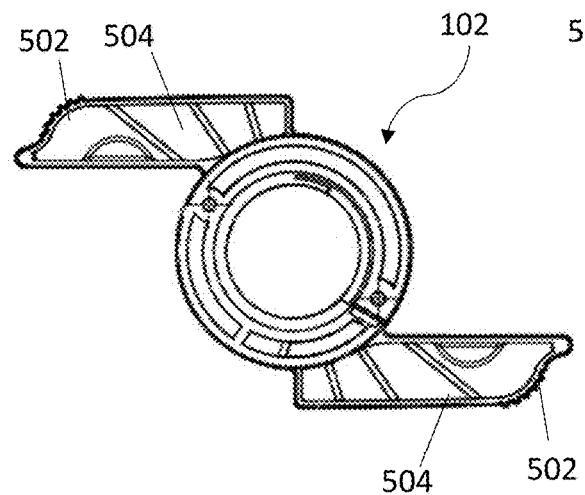
FIG. 5C illustrates a bottom view of the locking handle of the battery harvesting adapter according to one embodiment of the present invention as shown in FIG. 5B.
Figure 5D:
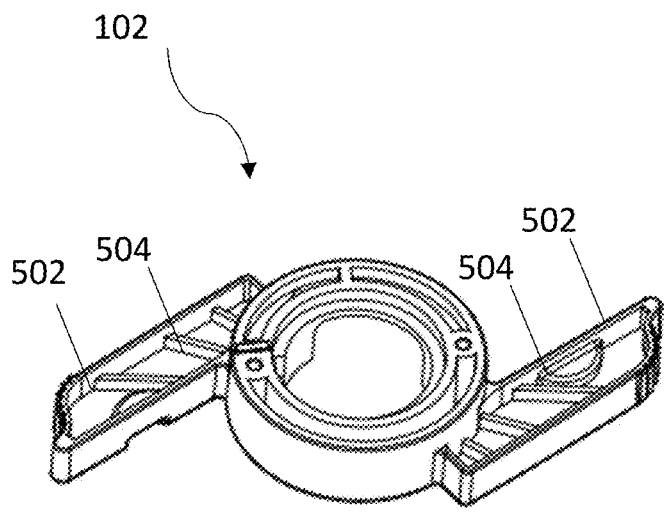
FIG. 5D illustrates a bottom perspective view of the locking handle of the battery harvesting adapter according to one embodiment of the present invention as shown in FIG. 5C.
Figure 5E:
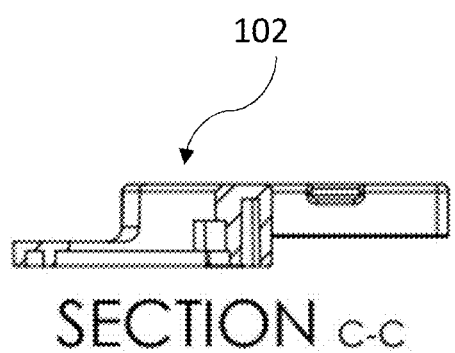
FIG. 5E illustrates a cross-section view of the locking handle of the battery harvesting adapter according to one embodiment of the present invention as shown in FIG. 5D.
Figure 5F:
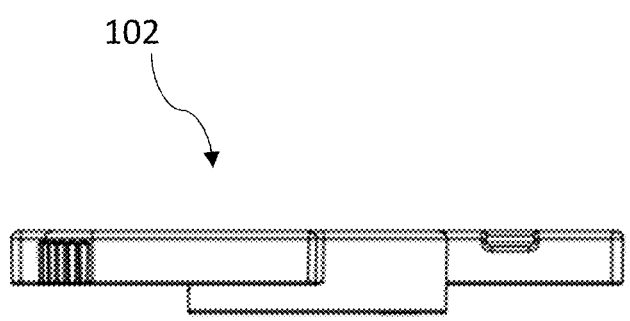
FIG. 5F illustrates a side view of a locking handle of the battery harvesting adapter according to one embodiment of the present invention as shown in FIG. 5E.
Figure 5G:
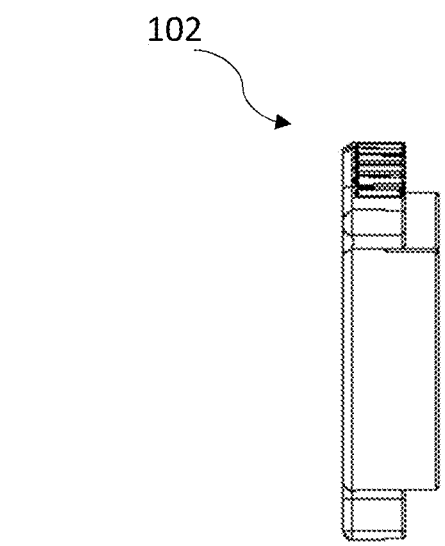
FIG. 5G illustrates another side view of a locking handle of the battery harvesting adapter according to one embodiment of the present invention as shown in FIG. 5F.

FIGS. 5A-5G illustrate various perspectives of a locking handle according to one embodiment of the present invention. FIG. 5A illustrates a top view of a locking handle 102 of a battery harvesting adapter according to one embodiment of the present invention. FIG. 5B illustrates a side perspective view of the locking handle 102 of the battery harvesting adapter according to one embodiment of the present invention as shown in FIG. 5A. FIG. 5C illustrates a bottom view of the locking handle 102 of the battery harvesting adapter according to one embodiment of the present invention as shown in FIG. 5B. FIG. 5D illustrates a bottom perspective view of the locking handle 102 of the battery harvesting adapter according to one embodiment of the present invention as shown in FIG. 5C. FIG. 5E illustrates a cross-section view of the locking handle 102 of the battery harvesting adapter according to one embodiment of the present invention as shown in FIG. 5D. FIG. 5F illustrates a side view of a locking handle 102 of the battery harvesting adapter according to one embodiment of the present invention as shown in FIG. 5E. FIG. 5G illustrates another side view of a locking handle 102 of the battery harvesting adapter according to one embodiment of the present invention as shown in FIG. 5F. In one embodiment, the locking handle is formed of a glass fiber reinforced resin.

Preferably, in one embodiment, the locking handle 102 is configured to rotate in a circular motion (e.g., 180° turn, 90° turn). In one embodiment, the locking handle 102 is configured to rotate in a circular motion with an angle between about 50° and about 90° (e.g., 70°). The negative contact plate is configured to tighten around the locking handle 102, thereby increasing the tension in the battery harvesting adapter 100. Advantageously, this enables the battery harvesting adapter to securely attach to a battery and eliminates the issue of inconsistent electrical connections. In one embodiment, the locking handle 102 is configured to rotate in a clockwise motion to securely attach the battery harvesting adapter to a battery. The locking handle 102 is further configured to rotate in a counterclockwise motion to disconnect the battery harvesting adapter from the battery. Alternatively, in other embodiment, the locking handle is 102 configured to rotate in a counterclockwise motion to connect to the battery. The locking handle 102 is further configured to rotate in a clockwise motion to disconnect from the battery.

In another embodiment, the locking handle 102 is configured to fit into a channel underneath the cover. Advantageously, this prevents the locking handle from being exposed when the battery harvesting adapter is securely attached to the battery. Preferably, in one embodiment, the locking handle 102 includes at least one thumb tab 502 attached to an arm 504 that is configured to rotate the locking handle 102 when pressure is applied. Advantageously, this simplifies the operation of the locking handle and reduces the amount of force required to securely attach the battery harvesting adapter to a battery. Prior art bayonet connections require twisting of the radio and the battery. This requires two hands, with one hand on the radio and one hand on the battery. This motion utilizes larger muscle groups (e.g., biceps, triceps), and would be difficult to complete by an injured operator (e.g., shot in the arm). In contrast, the present invention places the twisting motion inside the battery harvesting adapter. Advantageously, the present invention is operable to be utilized with one hand. For example, an injured operator is able to mate the battery harvesting adapter with the battery using one hand. The motion required does not utilize large muscle groups, but rather fine motor skills in the hand. For example, an injured operator who is able to place the battery in a stationary position (e.g., using a knee, rucksack, etc.) is operable to use one hand to place the battery harvesting adapter on the battery in the stationary position. The present invention does not require rotation of the battery. The negative contact plate is operable to rotate. In one embodiment, the negative contact plate is operable to rotate to mate the battery harvesting adapter to a battery.

Figure 6A:
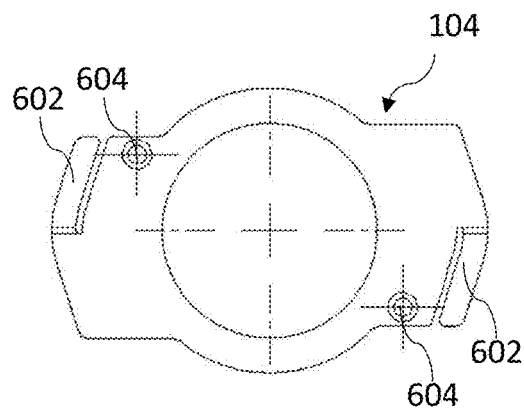
FIG. 6A illustrates a top view of a negative contact plate of a battery harvesting adapter according to one embodiment of the present invention.
Figure 6B:
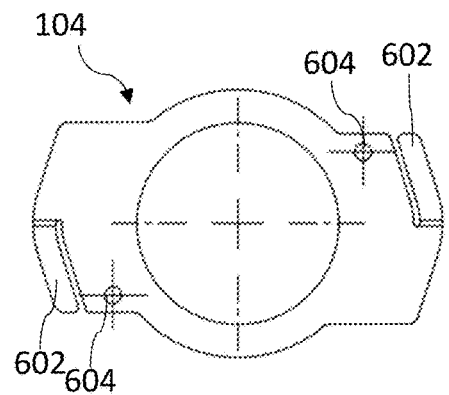
FIG. 6B illustrates a bottom view of the negative contact plate of the battery harvesting adapter according to one embodiment of the present invention as shown in FIG. 6A.
Figure 6C:
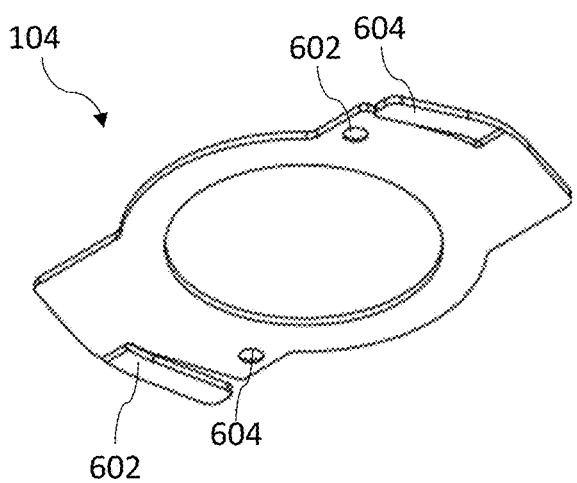
FIG. 6C illustrates a bottom perspective view of the negative contact plate of the battery harvesting adapter according to one embodiment of the present invention as shown in FIG. 6B.
Figure 6D:
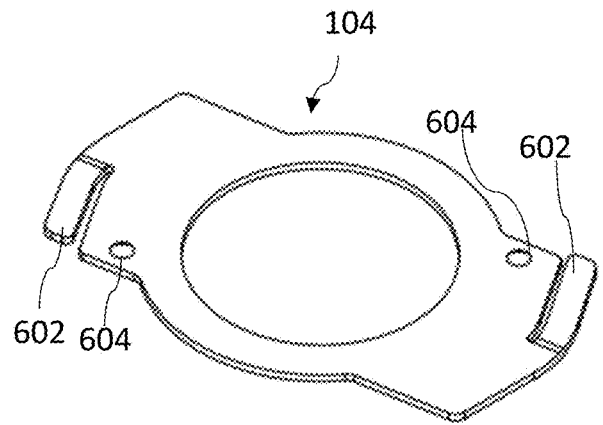
FIG. 6D illustrates a top perspective view of the negative contact plate of the battery harvesting adapter according to one embodiment of the present invention as shown in FIG. 6C.
Figure 6E:
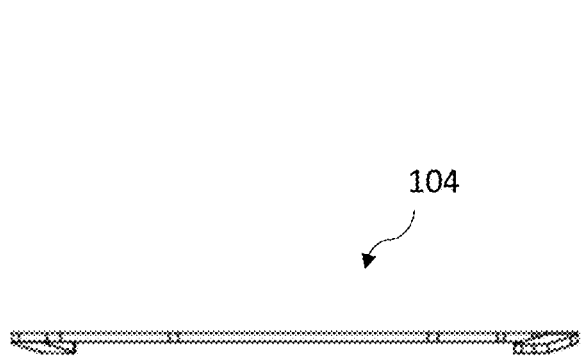
FIG. 6E illustrates a side view of the negative contact plate of the battery harvesting adapter according to one embodiment of the present invention as shown in FIG. 6D.
Figure 6F:
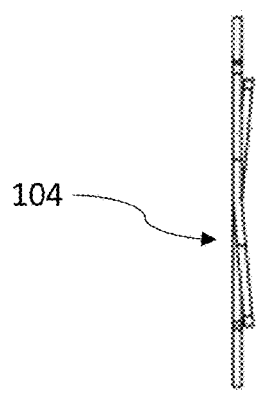
FIG. 6F illustrates another side view of the negative contact plate of the battery harvesting adapter according to one embodiment of the present invention as shown in FIG. 6E.

FIGS. 6A-6F illustrate various perspectives of a negative contact plate according to one embodiment of the present invention. In one embodiment, the negative contact plate 104 includes, but is not limited to, at least one wing tip 602 (e.g., two wing tips) and at least one hole 604 (e.g., two holes) configured to receive at least one screw. Alternatively, in another embodiment, the negative contact plate 104 includes one wing tip 602. FIG. 6A illustrates a top view of a negative contact plate 104 of a battery harvesting adapter according to one embodiment of the present invention. FIG. 6B illustrates a bottom view of the negative contact plate 104 of the battery harvesting adapter according to one embodiment of the present invention as shown in FIG. 6A. FIG. 6C illustrates a bottom perspective view of the negative contact plate 104 of the battery harvesting adapter according to one embodiment of the present invention as shown in FIG. 6B. FIG. 6D illustrates a top perspective view of the negative contact plate 104 of the battery harvesting adapter according to one embodiment of the present invention as shown in FIG. 6C. FIG. 6E illustrates a side view of the negative contact plate 104 of the battery harvesting adapter according to one embodiment of the present invention as shown in FIG. 6D. FIG. 6F illustrates a side view of the negative contact plate 104 of the battery harvesting adapter according to one embodiment of the present invention as shown in FIG. 6E. In one embodiment, the negative contact plate is formed of copper and/or nickel. In one embodiment, the negative contact plate has a high polish coating. In one embodiment, the negative contact plate has a thickness of less than 2 mm. In a preferred embodiment, the negative contact plate has a thickness of less than 1 mm (e.g., 0.6 mm). In one embodiment, the negative contact plate is configured to rotate in a circular motion with an angle between about 50° and about 90° (e.g., 70°).

The at least one wing tip 602 of the negative contact plate 104 is important for the battery harvesting adapter to securely attach the battery. During testing of the battery harvesting adapter, the battery harvesting adapter did not securely attach to all tested batteries without the negative contact plate including the at least one wing tip. The poor connection between the battery and the battery harvesting adapter resulted in an inconsistent electrical connection and caused issues when charging equipment. The at least one wing tip has been modified by introducing a pierced shape that allows for more spring-like function without making the bayonet itself weak. In one embodiment, the at least one wing tip is angled below the surface of the negative contact plate. For example, and not limitation, in another embodiment, the at least one wing tip is angled at least five degrees below the surface of the negative contact plate. Alternatively, the at least one wing tip is angled at least fifteen degrees below the surface of the negative contact plate. In yet another embodiment, the at least one wing tip is angled between about fifteen degrees and about thirty degrees below the surface of the negative contact plate. In yet another embodiment, the at least one wing tip includes two wing tips, and each of the two wing tips are angled at a different angle below the surface of the negative contact plate. For example, and not limitation, in one embodiment, a first wing tip is angled at least five degrees below the surface of the negative contact plate and a second wing tip is angled at least ten degrees below the surface of the negative contact plate.

The at least one wing tip creates spring tension. The spring tension helps to maintain the electrical connection between the battery harvesting tip and the battery. Additionally, this allows for the electrical connection to be maintained without eroding contact pieces between the battery and the battery harvesting tip. Common problems in prior art connections between a radio and a battery include that the electrical connections on the radio erode, the battery is often loose, and/or a spring on the radio is damaged. Further, a different battery is used every time. These problems often lead to intermittent connections between the bayonet connection and the battery, which lead to inconsistent or lost communications. Inconsistent or lost communications may result in death and/or mission failure.

Prior art connections may include contact portions to facilitate engagement of the bayonet with the battery. See, e.g., U.S. Pat. No. 10,490,962, which is incorporated herein by reference in its entirety. However, these contact portions are intended for use on stationary objects (e.g., chargers), and not intended for use in a mobile environment (e.g., a rucksack, moving vehicle, etc.) where the retention of the contact is paramount. As previously described, the spring tension of the present invention allows for use in the mobile environment and prevents problems that often lead to intermittent connections between the bayonet connection and the battery, which lead to inconsistent or lost communications. Inconsistent or lost communications may result in death and/or mission failure.

Figure 7A:
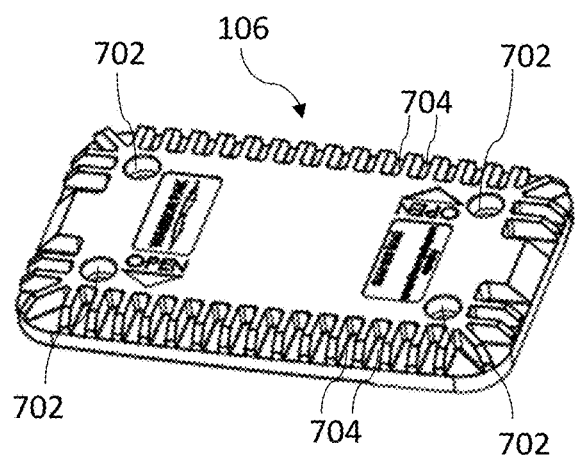
FIG. 7A illustrates a top perspective view of a cover of a battery harvesting adapter according to one embodiment of the present invention.
Figure 7B:
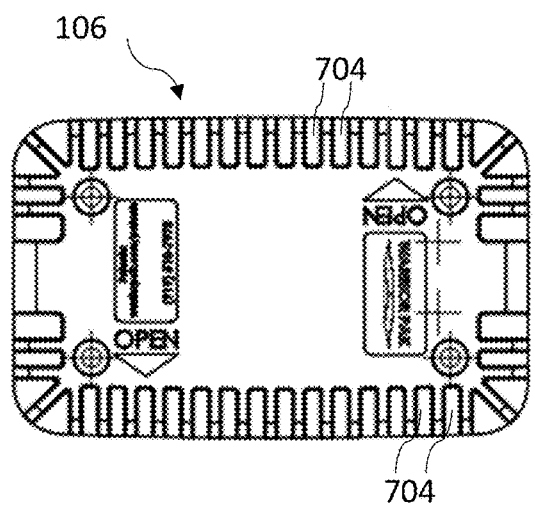
FIG. 7B illustrates a top view of the cover of the battery harvesting adapter according to one embodiment of the present invention as shown in FIG. 7A.
Figure 7C:
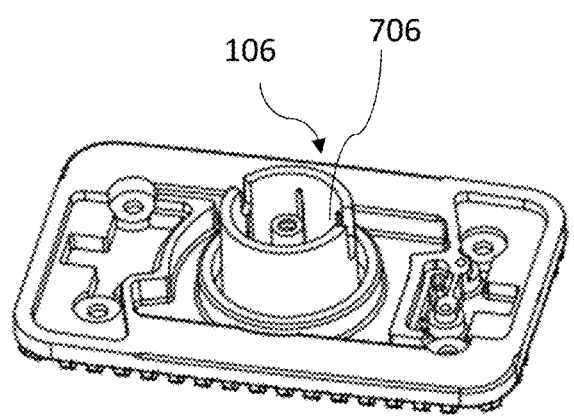
FIG. 7C illustrates a bottom perspective view of the cover of the battery harvesting adapter according to one embodiment of the present invention as shown in FIG. 7B.
Figure 7D:
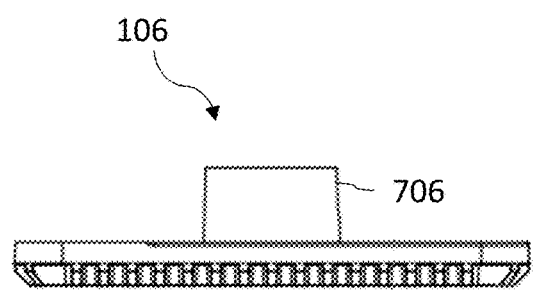
FIG. 7D illustrates a side view of the cover of the battery harvesting adapter according to one embodiment of the present invention as shown in FIG. 7C.

FIGS. 7A-7G illustrate the cover of the battery harvesting adapter according to one embodiment of the present invention. FIG. 7A illustrates a top perspective view of a cover 106 of a battery harvesting adapter according to one embodiment of the present invention. FIG. 7B illustrates a top view of the cover 106 of the battery harvesting adapter according to one embodiment of the present invention as shown in FIG. 7A. FIG. 7C illustrates a bottom perspective view of the cover 106 of the battery harvesting adapter according to one embodiment of the present invention as shown in FIG. 7B. FIG. 7D illustrates a side view of the cover 106 of the battery harvesting adapter according to one embodiment of the present invention as shown in FIG. 7C. FIG. 7E illustrates a bottom view of the cover 106 of the battery harvesting adapter according to one embodiment of the present invention as shown in FIG. 7D. FIG. 7F illustrates a cross-section view of the cover 106 of the battery harvesting adapter according to one embodiment of the present invention as shown in FIG. 7E. FIG. 7G illustrates another side view of the cover 106 of the battery harvesting adapter according to one embodiment of the present invention as shown in FIG. 7F. The cover is operable to protect internal components from exposure to environmental elements (e.g., dust, water). The cover 106 includes a plurality of cover holes 702 operable to receive screws. The screws attach the cover 106 to the body. In a preferred embodiment, the cover 106 includes a plurality of grooves 704 to provide grip. The bottom of the cover 106 preferably includes a chamber 706. In one embodiment, the cover is formed of a glass fiber reinforced resin.

Figure 8A:
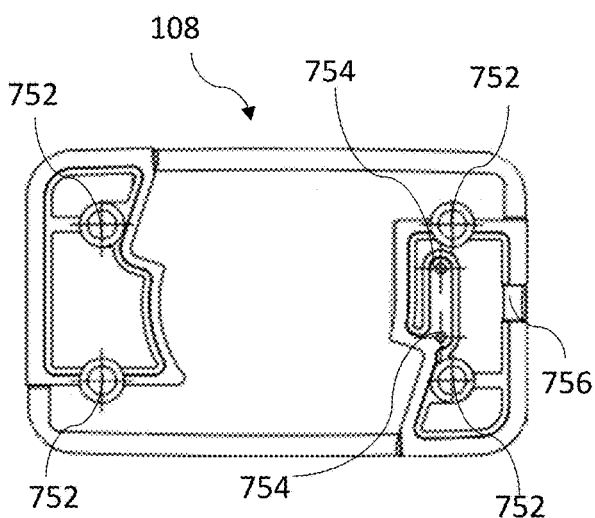
FIG. 8A illustrates a top view of a body of a battery harvesting adapter according to one embodiment of the present invention.
Figure 8B:
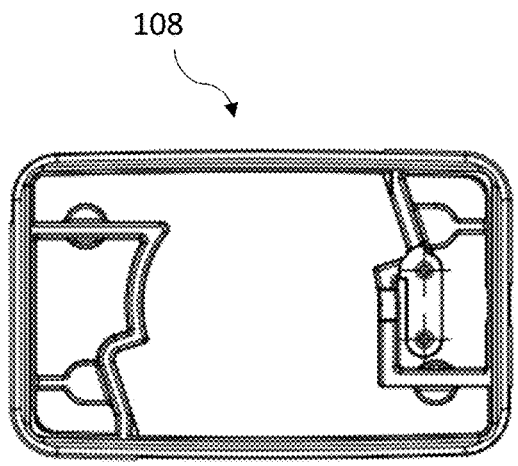
FIG. 8B illustrates a bottom view of the body of the battery harvesting adapter according to one embodiment of the present invention as shown in FIG. 8A.
Figure 8C:
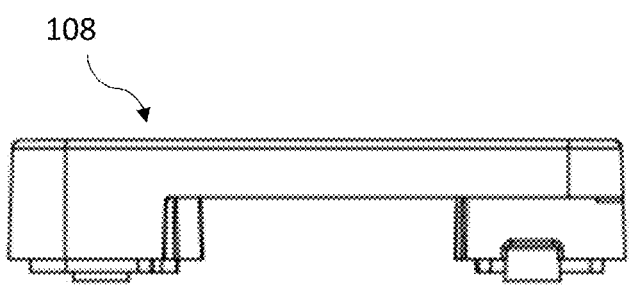
FIG. 8C illustrates a side view of the body of the battery harvesting adapter according to one embodiment of the present invention as shown in FIG. 8B.
Figure 8D:
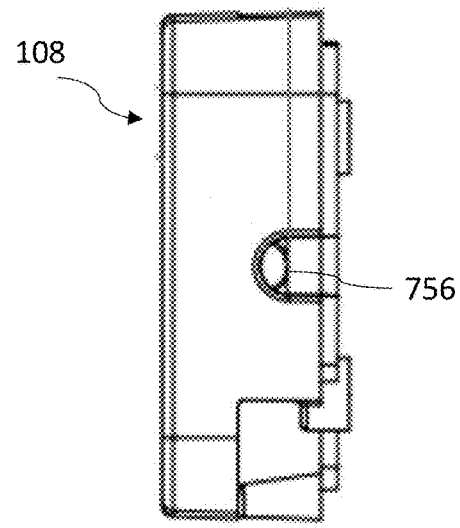
FIG. 8D illustrates another side view of the body of the battery harvesting adapter according to one embodiment of the present invention as shown in FIG. 8C.
Figure 8E:
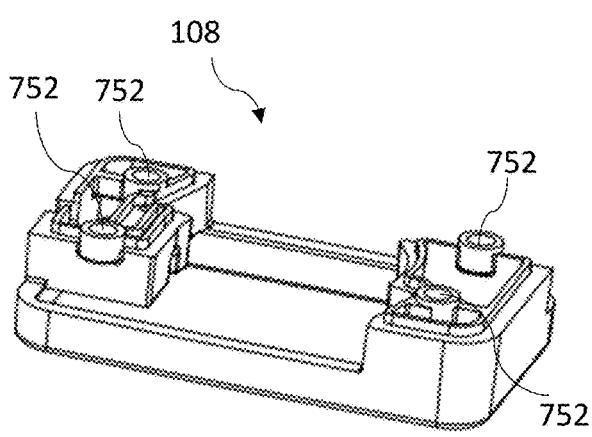
FIG. 8E illustrates a top perspective view of the body of the battery harvesting adapter according to one embodiment of the present invention as shown in FIG. 8D.
Figure 8F:
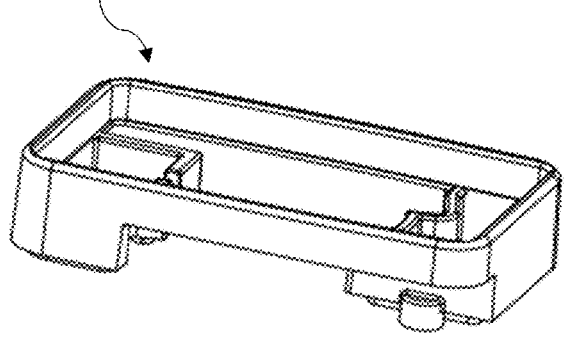
FIG. 8F illustrates a bottom perspective view of the body of the battery harvesting adapter according to one embodiment of the present invention as shown in FIG. 8E.

FIGS. 8A-8F illustrate various perspectives of the body 108 of the battery harvesting adapter according to one embodiment of the present invention. FIG. 8A illustrates a top view of a body 108 of a battery harvesting adapter according to one embodiment of the present invention. FIG. 8B illustrates a bottom view of the body 108 of the battery harvesting adapter according to one embodiment of the present invention as shown in FIG. 8A. FIG. 8C illustrates a side view of the body 108 of the battery harvesting adapter according to one embodiment of the present invention as shown in FIG. 8B. FIG. 8D illustrates another side view of the body 108 of the battery harvesting adapter according to one embodiment of the present invention as shown in FIG. 8C. FIG. 8E illustrates a top perspective view of the body 108 of the battery harvesting adapter according to one embodiment of the present invention as shown in FIG. 8D. FIG. 8F illustrates a bottom perspective view of the body 108 of the battery harvesting adapter according to one embodiment of the present invention as shown in FIG. 8E. The body 108 includes a plurality of posts 752 operable to receive screws. The screws attach the cover to the body 108. The body 108 also includes a plurality of body holes 754 operable to receive self-tapping screws. The self-tapping screws attach the cable locker to the body 108. In one embodiment, the body is formed of a glass fiber reinforced resin.

Preferably, in one embodiment, the body 108 is configured to protect the locking handle, the negative contact plate, the cable locker, the PCB cover, the PCBA, the contact pins, and the adapter ring from environmental elements (e.g., water, dirt). The body 108 preferably includes at least one channel 756 to receive the spring and the cable. Alternatively, the at least one channel is operable to receive a cable without a spring.

In one embodiment, the at least one channel 756 is configured to receive a flexible omnidirectional lead. The flexible omnidirectional lead has a connector portion (e.g., output connector) and a wiring portion (e.g., flexible wire or cable). The output connector is any type or style of connector needed to mate to the equipment to be used with the battery harvesting adapter. In a preferred embodiment, the output connector is a female circular type of connector (e.g., female FISCHER 105 A087 connector). In yet another embodiment, the output connector has an Ingress Protection (IP) rating of IP2X, IP3X, IP4X, IP5X, IP6X, IPX1, IPX2, IPX3, IPX4, IPX5, IPX6, IPX7, or IPX8. More preferably, the put connector has an IP rating of IPX6, IPX7, or IPX8. IP ratings are described in IEC standard 60529, ed. 2.2 (05/2015), published by the International Electrotechnical Commission, which is incorporated herein by reference in its entirety. In one embodiment, the output connector meets standards described in Department of Defense documents MIL-STD-202E, MIL-STD-202F published February 1998, MIL-STD-202G published 18 Jul. 2003, and/or MIL-STD-202H published 18 Apr. 2015, each of which is incorporated herein by reference in its entirety.

Figure 9A:
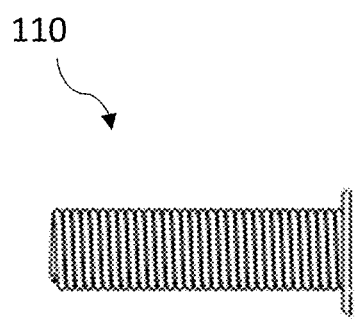
FIG. 9A illustrates a side view of a spring of a battery harvesting adapter according to one embodiment of the present invention.
Figure 9B:
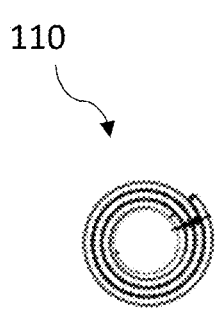
FIG. 9B illustrates a top view of the spring of the battery harvesting adapter according to one embodiment of the present invention as shown in FIG. 9A.
Figure 9C:
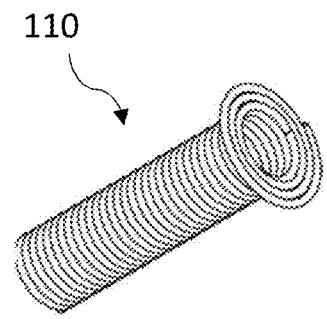
FIG. 9C illustrates a side perspective view of the spring of the battery harvesting adapter according to one embodiment of the present invention as shown in FIG. 9B.
Figure 10A:
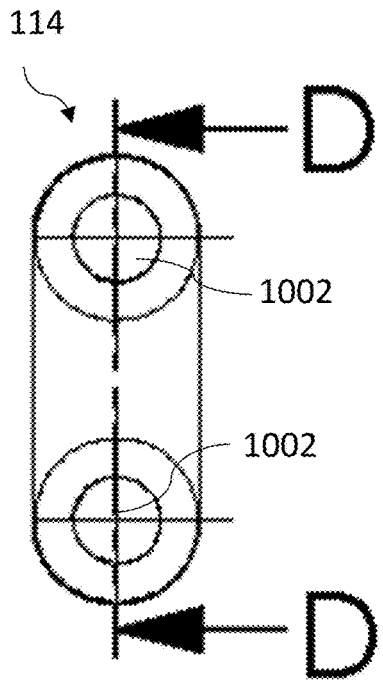
FIG. 10A illustrates a top view of a cable locker of a battery harvesting adapter according to one embodiment of the present invention.
Figure 10B:
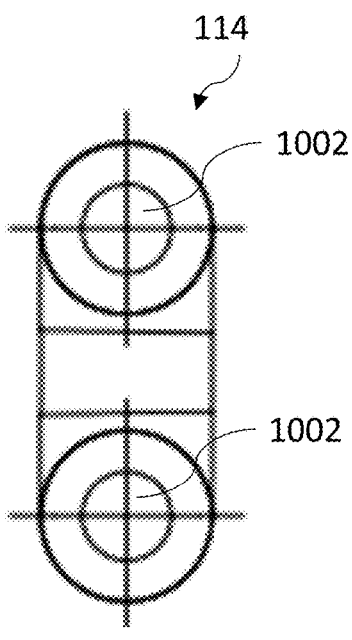
FIG. 10B illustrates a bottom view of the cable locker of the battery harvesting adapter according to one embodiment of the present invention as shown in FIG. 10A.
Figure 10C:
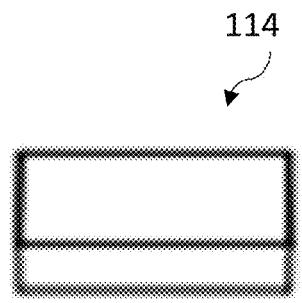
FIG. 10C illustrates a side view of the cable locker of the battery harvesting adapter according to one embodiment of the present invention as shown in FIG. 10B.
Figure 10D:
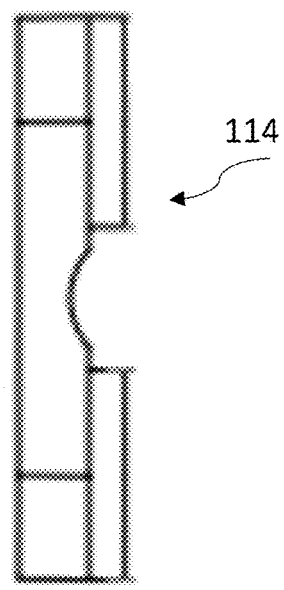
FIG. 10D illustrates another side view of the cable locker of the battery harvesting adapter according to one embodiment of the present invention as shown in FIG. 10C.
Figure 10E:
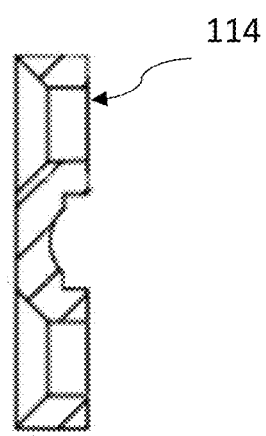
FIG. 10E illustrates a cross section view of the cable locker of the battery harvesting adapter according to one embodiment of the present invention as shown in FIG. 10D.
Figure 10F:
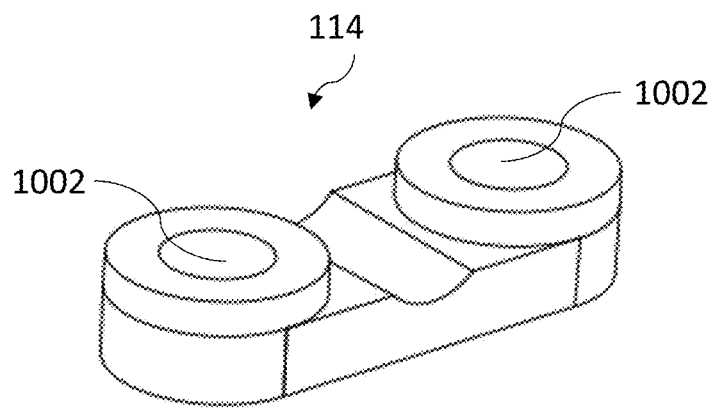
FIG. 10F illustrates a top perspective view of the cable locker of the battery harvesting adapter according to one embodiment of the present invention as shown in FIG. 10E.
Figure 10G:
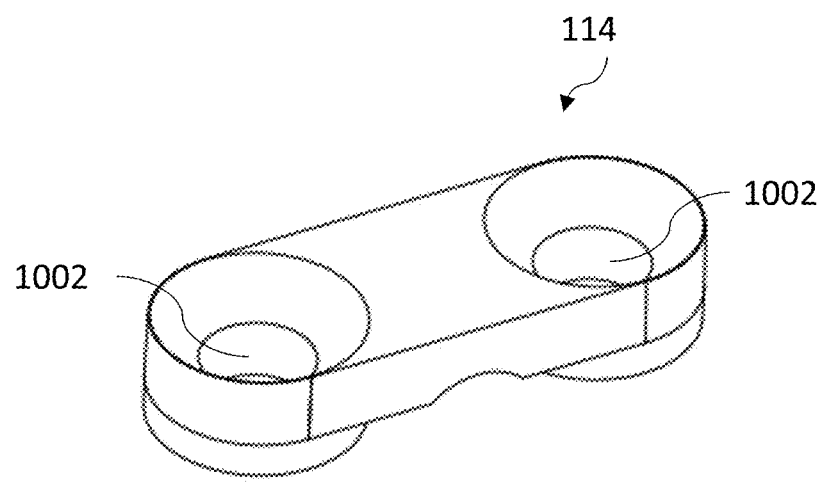
FIG. 10G illustrates a bottom perspective view of the cable locker of the battery harvesting adapter according to one embodiment of the present invention as shown in FIG. 10F.

The cable is fitted into the at least one channel formed in the body of the battery harvesting adapter such that the output connector extends away from the battery harvesting adapter. A spring is provided around the cable, such that a portion of the spring is inside the battery harvesting adapter and a portion of the spring is outside the battery harvesting adapter. FIGS. 9A-9C illustrate an example of a spring 110 of the battery harvesting adapter according to one embodiment of the present invention. In one example, the spring is a steel spring. In one embodiment, the spring has a length between about 6.35 mm (0.25 inches) and about 38.1 mm (1.5 inches).

In one embodiment, the flexible cable and the spring are held securely in the at least one channel of the battery harvesting adapter via a cable locker. FIGS. 10A-10E illustrates various perspectives of a cable locker 114 of the battery harvesting adapter according to one embodiment of the present invention. In one embodiment, the cable locker 114 is attached to the body via self-tapping screws placed through cable locker holes 1002. Alternatively, the cable and the spring are held securely in the channel of the battery harvesting adapter using an adhesive, a retention pin, a hex nut, screws, a hook anchor, and/or a zip tie. In one embodiment, the cable locker is formed of a glass fiber reinforced resin.

The cable locker is configured to provide enough slack for the cable to turn and move when the locking handle is rotated. In one embodiment, the slack is enclosed in the chamber (shown as 706 in FIG. 7C). Additionally, the cable locker is positioned so that a portion of the spring is positioned inside the battery harvesting adapter and a portion of the spring is position on the outside of the battery harvesting adapter.

The presence of the spring around the cable allows the lead to be flexed in any direction for convenient connection to equipment from any angle. The presence of the spring around the cable also allows the lead to be flexed repeatedly without breaking or failing. The presence of the spring further allows for the cable to be flexed at an approximately 90 degree angle flush against the battery harvesting adapter, as equipment such as the battery harvesting adapter is often worn in a pouch that does not have an opening to accommodate a cable. The design of the flexible omnidirectional lead provides a benefit over conventional leads and/or connectors that are rigid, wherein conventional rigid leads allow connection from only one angle and are prone to breakage if bumped.

In one embodiment, the flexible omnidirectional lead includes a dust cap. The dust cap is configured to protect the output connector from environmental elements (e.g., water, dust, dirt). In one embodiment, the dust cap includes a loop that slips over the cable to fasten the dust cap to the cable. In another embodiment, the dust cap is molded into a boot of the output connector. Advantageously, the output connector is configured to operate after exposure to dirt, even if the dust cap is removed. This allows for soldiers to continue to use the battery harvesting adapter in dirty and/or dusty environments.

In one embodiment, the cable includes at least two output connectors. In one embodiment, the at least two output connectors include a first connector (e.g., a female circular type of connector (e.g., female FISCHER 105 A087 connector)) and a second connector (e.g., USB receptacle). In one embodiment, the cable further includes a DC-DC converter. In one embodiment, the DC-DC converter is operable to step down the voltage (e.g., to 5V for the USB receptacle). Alternatively, the first connector and the second connector are the same type of connector.

Figure 11A:
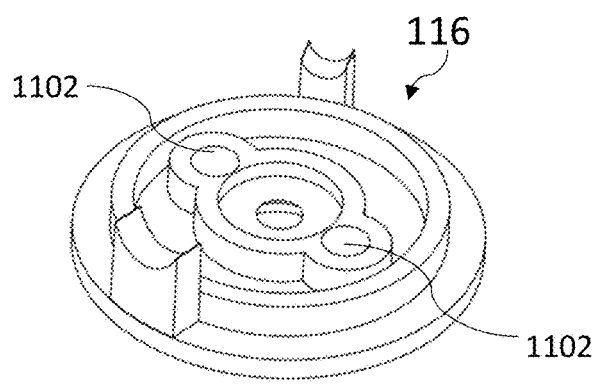
FIG. 11A illustrates a bottom perspective view of a PCB cover of a battery harvesting adapter according to one embodiment of the present invention.
Figure 11B:
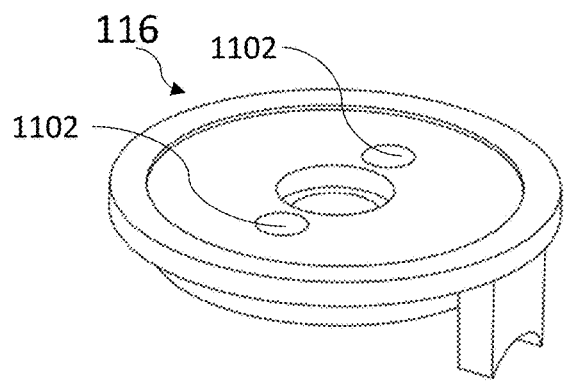
FIG. 11B illustrates a top perspective view of the PCB cover of the battery harvesting adapter according to one embodiment of the present invention as shown in FIG. 11A.
Figure 11C:
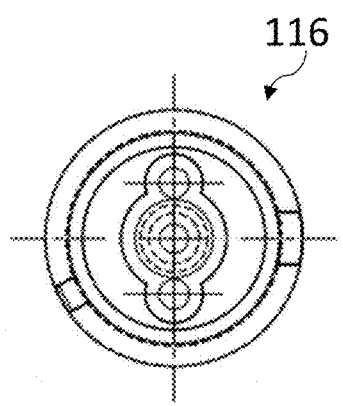
FIG. 11C illustrates a top view of the PCB cover of the battery harvesting adapter according to one embodiment of the present invention as shown in FIG. 11B.
Figure 11D:
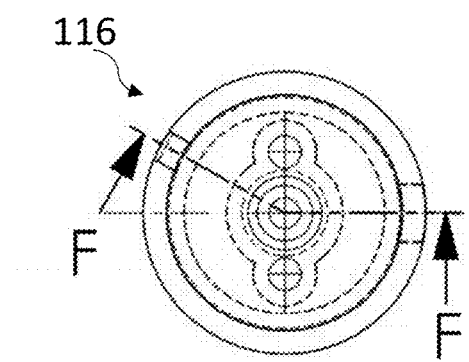
FIG. 11D illustrates a bottom view of the PCB cover of the battery harvesting adapter according to one embodiment of the present invention as shown in FIG. 11C.
Figure 11E:
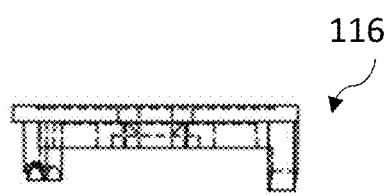
FIG. 11E illustrates a cross section view of the PCB cover of the battery harvesting adapter according to one embodiment of the present invention as shown in FIG. 11D.
Figure 11F:
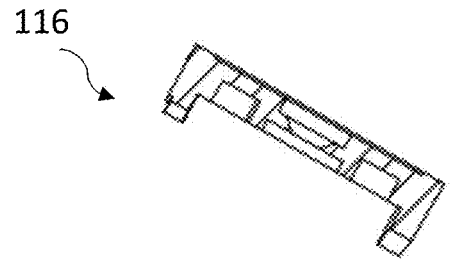
FIG. 11F illustrates a cross section view of the PCB cover of the battery harvesting adapter according to one embodiment of the present invention as shown in FIG. 11E.
Figure 11G:
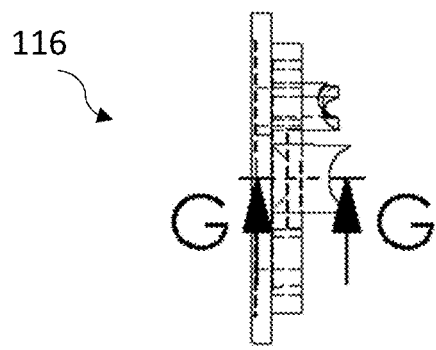
FIG. 11G illustrates a cross-section view of a PCB cover of the battery harvesting adapter according to one embodiment of the present invention as shown in FIG. 11F.
Figure 11H:
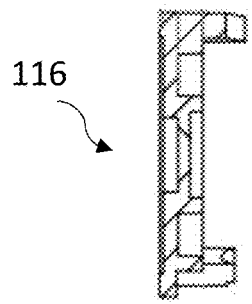
FIG. 11H illustrates a cross-section view of a PCB cover of the battery harvesting adapter according to one embodiment of the present invention as shown in FIG. 11G.

The battery harvesting adapter further includes a printed circuit board cover (PCB) and a PCB assembly (PCBA). FIGS. 11A-11H illustrate the PCB cover 116 according to one embodiment of the present invention. FIG. 11A illustrates a bottom perspective view of a PCB cover 116 of a battery harvesting adapter according to one embodiment of the present invention. FIG. 11B illustrates a top perspective view of the PCB cover 116 of the battery harvesting adapter according to one embodiment of the present invention as shown in FIG. 11A. FIG. 11C illustrates a top view of the PCB cover 116 of the battery harvesting adapter according to one embodiment of the present invention as shown in FIG. 11B. FIG. 11D illustrates a bottom view of the PCB cover 116 of the battery harvesting adapter according to one embodiment of the present invention as shown in FIG. 11C. FIG. 11E illustrates a cross section view of the PCB cover 116 of the battery harvesting adapter according to one embodiment of the present invention as shown in FIG. 11D. FIG. 11F illustrates a cross section view of the PCB cover 116 of the battery harvesting adapter according to one embodiment of the present invention as shown in FIG. 11E. FIG. 11G illustrates a cross-section view of a PCB cover 116 of the battery harvesting adapter according to one embodiment of the present invention as shown in FIG. 11F. FIG. 11H illustrates a cross-section view of a PCB cover 116 of the battery harvesting adapter according to one embodiment of the present invention as shown in FIG. 11H. The PCB cover 116 includes a plurality of PCB cover holes 1102 operable to receive the contact pins. In one embodiment, the PCB cover is formed of a glass fiber reinforced resin. In one embodiment, the plurality of PCB cover holes includes a top hole, a middle hole, and a bottom hole. In one embodiment, the top hole and the bottom hole each receive a contact pin. In an alternative embodiment, the top hole, the middle hole, and the bottom hole all receive a contact pin. In one embodiment, contact pins for the top hole and the bottom hole receive power from the battery. In one embodiment, the contact pin for the middle hole receives data from the battery.

Figure 12A:
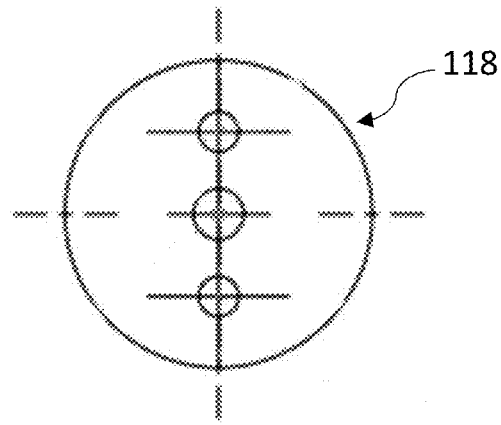
FIG. 12A illustrates a top view of the printed circuit board assembly of a battery harvesting adapter according to one embodiment of the present invention.
Figure 12B:
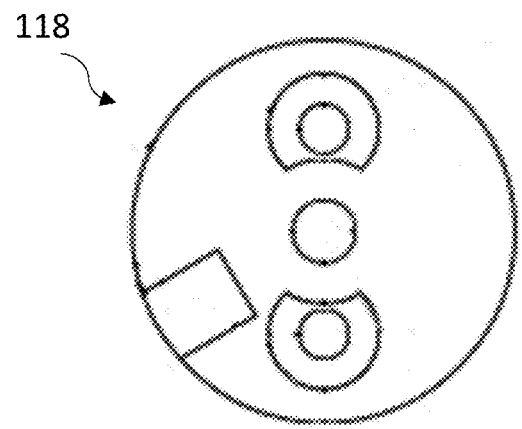
FIG. 12B illustrates a bottom view of the printed circuit board assembly of the battery harvesting adapter according to one embodiment of the present invention as shown in FIG. 12A.
Figure 12C:
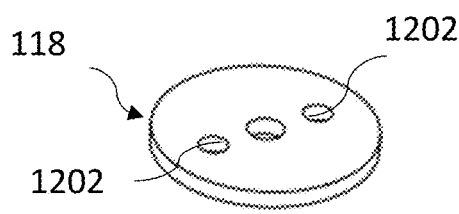
FIG. 12C illustrates a top perspective view of a printed circuit board assembly of the battery harvesting adapter according to one embodiment of the present invention as shown in FIG. 12B.
Figure 12D:
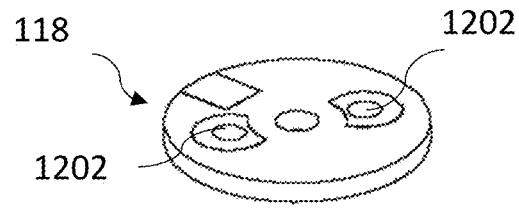
FIG. 12D illustrates a bottom perspective view of a printed circuit board assembly of the battery harvesting adapter according to one embodiment of the present invention as shown in FIG. 12C.
Figure 12E:
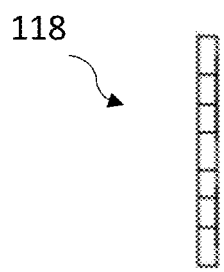
FIG. 12E illustrates a side view of the printed circuit board assembly of the battery harvesting adapter according to one embodiment of the present invention as shown in FIG. 12D.

FIGS. 12A-12E illustrate various perspectives of a PCB assembly 118 according to one embodiment of the present invention. FIG. 12A illustrates a top view of printed circuit board assembly 118 of a battery harvesting adapter according to one embodiment of the present invention. FIG. 12B illustrates a bottom view of the printed circuit board assembly 118 of the battery harvesting adapter according to one embodiment of the present invention as shown in FIG. 12A. FIG. 12C illustrates a top perspective view of the printed circuit board assembly 118 of the battery harvesting adapter according to one embodiment of the present invention as shown in FIG. 12B. FIG. 12D illustrates a bottom perspective view of a printed circuit board assembly of the battery harvesting adapter according to one embodiment of the present invention as shown in FIG. 12C. FIG. 12E illustrates a side view of the printed circuit board assembly 118 of the battery harvesting adapter according to one embodiment of the present invention as shown in FIG. 12D. The PCBA cover 116 includes a plurality of PCBA holes 1202 operable to receive the contact pins.

In one embodiment, the PCB includes control electronics. In one embodiment, the control electronics include at least one controller. By way of example, and not limitation, the at least one controller is a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In one embodiment, the control electronics further include a power conditioning module. The power conditioning module is configured to receive a certain input voltage from the battery and output a second voltage via the output connector to power a device. The power conditioning module is operable to be any power conditioning circuitry that receives a certain input voltage $V_{IN}$ within an expected input voltage range and generates a desired output voltage $V_{OUT}$. In one embodiment, the power conditioning module includes a DC-DC converter.

The input of the power conditioning module (i.e., the input voltage $V_{IN}$) is driven by a battery. The battery is operable to be any battery such as, but not limited to, a non-rechargeable battery or a rechargeable battery that fits to the PRC-148 radio, the PRC-152 radio, the PRC-161 radio, the PRC-163 radio, the ISR Transceiver, the SADL Micro-Lite (RT-1922) radio, the TacRover-E (TRE) radio, the Tactical ROVER-P (SIR 2.5) radio, the Coastal Defense MVR-IV video down link receiver, or the Persistent Systems Wave Relay MPU5 radio. In another embodiment, the input voltage $V_{IN}$ of the battery harvesting adapter, which is supplied by the battery, is operable to be, for example, from about 7.2 VDC±3% to about 12.7 VDC±3%. In this example, the power conditioning module converts the input voltage $V_{IN}$, which is operable to range from about 7.2 VDC±3% to about 12.7 VDC±3%, to an output voltage $V_{OUT}$, which is operable to be about 11.8+0.5 VDC. Because the input voltage $V_{IN}$ varies, at certain times the power conditioning module is converting a lower input voltage to a higher output voltage, at other times the power conditioning module is converting a higher input voltage to a lower output voltage, and at yet others times the input voltage of the power conditioning module is substantially the same as the output voltage.

The output voltage $V_{OUT}$ of the power conditioning module is operable to power at least one device. In one embodiment, the $V_{OUT}$ is between about 9.6 VDC to about 34.3 VDC. Alternatively, the $V_{OUT}$ is between about 9 VDC to about 16 VDC. In yet another embodiment, the $V_{OUT}$ is about 8 VDC to about 28 VDC. In still another embodiment, the $V_{OUT}$ is about 5 VDC to about 50 VDC.

In one embodiment, the control electronics further include a wired input/output port and/or a communications interface (e.g., wired, wireless) configured to facilitate programming of the controller and/or the power conditioning module. The communications interface includes any wired and/or wireless communication interface for connecting to a network (not shown) and by which information is exchanged with other devices (not shown) connected to the network. Examples of wired communication interfaces include, but are not limited to, USB ports, RS232 connectors, RJ45 connectors, Ethernet, and any combinations thereof. Examples of wireless communication interfaces include, but are not limited to, an Intranet connection, Internet, ISM, BLUETOOTH® technology, WI-FI, WI-MAX, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

In one embodiment, the battery harvesting adapter includes control electronics that are programmable. The control electronics are preferably operable to receive and send power control instructions. The battery harvesting adapter is preferably operable receive different input voltages and still generate the required output voltage based on the power control instructions.

In yet another embodiment, the PCB includes at least one diode. In another embodiment, the at least one diode is configured for up to 40 Volts and 5 amps. For example, and not limitation, the diode includes, but is not limited to, a Schottky diode. Advantageously, the diode is configured to prevent current from flowing into the battery.

In one embodiment, the battery harvesting adapter further includes an indicator (e.g., light emitting diode (LED)) operable to indicate when the battery harvesting adapter is receiving power from the battery (e.g., LED on) and when the battery harvesting adapter is not receiving power from the battery (e.g., LED off). In one embodiment, the cover and/or the body includes at least one hole for the indicator.

Figure 13A:
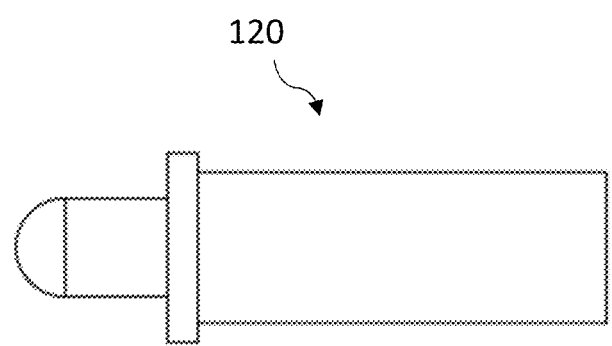
FIG. 13A illustrates a side perspective of a contact pin of a battery harvesting adapter according to one embodiment of the present invention.
Figure 13B:
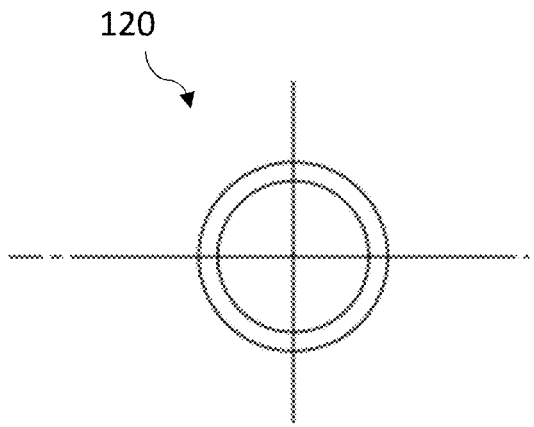
FIG. 13B illustrates a bottom view of the contact pin of the battery harvesting adapter according to one embodiment of the present invention as shown in FIG. 13A.
Figure 13C:
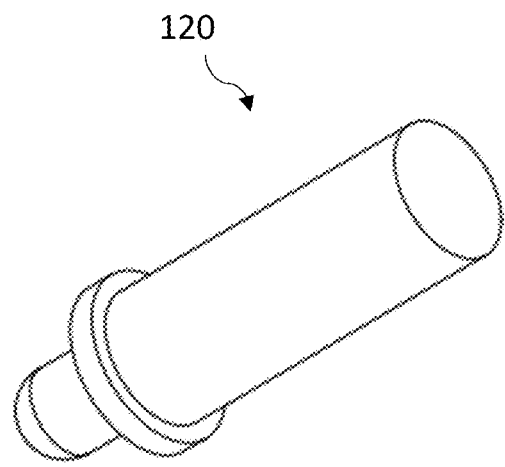
FIG. 13C illustrates a side perspective view of the contact pin of the battery harvesting adapter according to one embodiment of the present invention as shown in FIG. 13B.

FIGS. 13A-13C illustrate various perspectives of a contact pin 120 according to one embodiment of the present invention. FIG. 13A illustrates a side perspective view of a contact pin 120 of a battery harvesting adapter according to one embodiment of the present invention. FIG. 13B illustrates a bottom view of the contact pin 120 of the battery harvesting adapter according to one embodiment of the present invention as shown in FIG. 13A. FIG. 13C illustrates a side perspective view of the contact pin 120 of the battery harvesting adapter according to one embodiment of the present invention as shown in FIG. 13B. In one embodiment, the contact pin includes at least one power pin. In a preferred embodiment, the contact pin includes at least two power pins. In one embodiment, the contact pin is formed of brass, stainless steel, and/or gold. In one embodiment, the contact pin is gold plated. In one embodiment, the contact pin includes spring tension. For example and not limitation, the contact pin has a spring force at pre-tension of 0.6 N and a spring force at working stroke of 2 N.

Figure 14A:
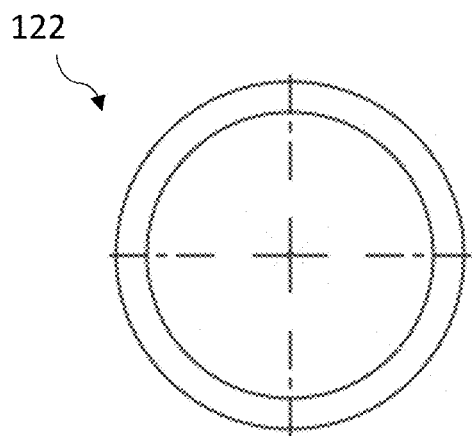
FIG. 14A illustrates a top view of an adapter ring of a battery harvesting adapter according to one embodiment of the present invention.
Figure 14B:
FIG. 14B illustrates a side view of the adapter ring of the battery harvesting adapter according to one embodiment of the present invention as shown in FIG. 14A.
Figure 14C:
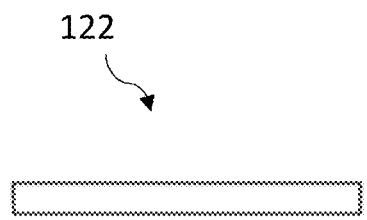
FIG. 14C illustrates another side view of the adapter ring of the battery harvesting adapter according to one embodiment of the present invention as shown in FIG. 14B.
Figure 14D:
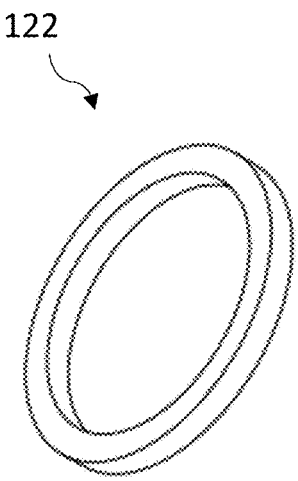
FIG. 14D illustrates a front perspective view of the adapter ring of the battery harvesting adapter according to one embodiment of the present invention as shown in FIG. 14C.

FIGS. 14A-14D illustrate an embodiment of an adapter ring 122 according to one embodiment of the present invention. FIG. 14A illustrates a top view of an adapter ring 122 of a battery harvesting adapter according to one embodiment of the present invention. FIG. 14B illustrates a side view of the adapter ring 122 of the battery harvesting adapter according to one embodiment of the present invention as shown in FIG. 14A. FIG. 14C illustrates a side view of the adapter ring 122 of the battery harvesting adapter according to one embodiment of the present invention as shown in FIG. 14B. FIG. 14D illustrates a front perspective view of the adapter ring 122 of the battery harvesting adapter according to one embodiment of the present invention as shown in FIG. 14C. In one embodiment, the adapter ring is formed of glass fiber reinforced resin.

FIGS. 15A-15C illustrate an embodiment of a self-tapping screw according to one embodiment of the present invention. FIG. 15A illustrates a top view of the self-tapping screw 124 of the battery harvesting adapter according to one embodiment of the present invention. FIG. 15B illustrates a side view of the self-tapping screw 124 of the battery harvesting adapter according to one embodiment of the present invention as shown in FIG. 15A. FIG. 15C illustrates a side perspective view of the self-tapping screw 124 of the battery harvesting adapter according to one embodiment of the present invention as shown in FIG. 15B. In a preferred embodiment, the self-tapping screw 124 is used to attach the cable locker to the battery harvesting adapter. In one embodiment, the self-tapping screw is formed of stainless steel.

Figure 16A:
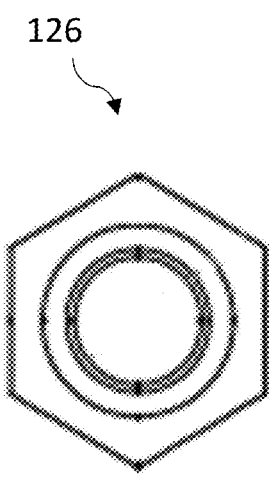
FIG. 16A illustrates a top view of a hex nut of a battery harvesting adapter according to one embodiment of the present invention.
Figure 16B:
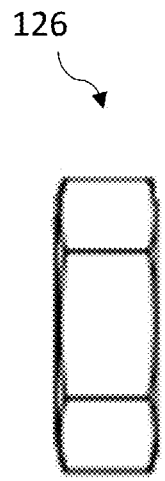
FIG. 16B illustrates a side view the hex nut of the battery harvesting adapter according to one embodiment of the present invention as shown in FIG. 14A.
Figure 16C:
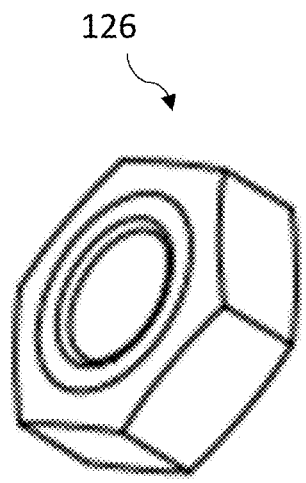
FIG. 16C illustrates a front perspective view of the hex nut of the battery harvesting adapter according to one embodiment of the present invention as shown in FIG. 16B.

FIGS. 16A-16C illustrate an embodiment of a hex nut 126 according to one embodiment of the present invention. FIG. 16A illustrates a top view of a hex nut 126 of a battery harvesting adapter according to one embodiment of the present invention. FIG. 16B illustrates a side view the hex nut 126 of the battery harvesting adapter according to one embodiment of the present invention as shown in FIG. 14A. FIG. 16C illustrates a front perspective view of the hex nut 126 of the battery harvesting adapter according to one embodiment of the present invention as shown in FIG. 16B. In one embodiment, the hex nut is formed of stainless steel.

Figure 17A:
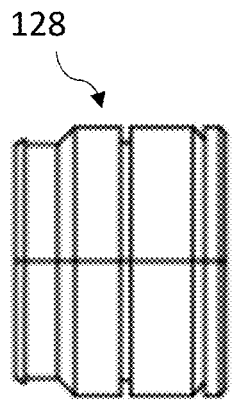
FIG. 17A illustrates a side view of a tapered insert of a battery harvesting adapter according to one embodiment of the present invention.
Figure 17B:
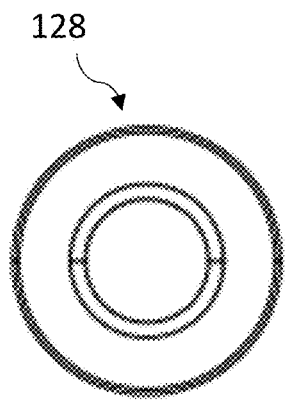
FIG. 17B illustrates a top view of the tapered insert of the battery harvesting adapter according to one embodiment of the present invention as shown in FIG. 17A.
Figure 17C:
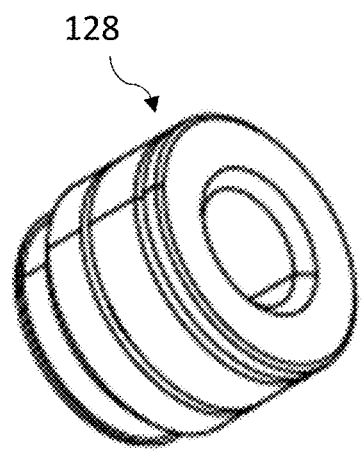
FIG. 17C illustrates a side perspective view of the tapered insert of a battery harvesting adapter according to one embodiment of the present invention as shown in FIG. 17B.

FIGS. 17A-17C illustrate an embodiment of a tapered insert 128 according to one embodiment of the present invention. FIG. 17A illustrates a side view of a tapered insert 128 of a battery harvesting adapter according to one embodiment of the present invention. FIG. 17B illustrates a top view of the tapered insert 128 of the battery harvesting adapter according to one embodiment of the present invention as shown in FIG. 17A. FIG. 17C illustrates a side perspective view of the tapered insert 128 of a battery harvesting adapter according to one embodiment of the present invention as shown in FIG. 17B. In a preferred embodiment, the tapered insert 128 is configured to receive a screw to secure the cover of the battery harvesting adapter to the body. In one embodiment, the tapered insert is formed of brass.

Figure 18A:
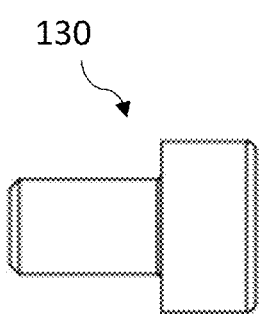
FIG. 18A illustrates a side perspective view of a screw of the battery harvesting adapter according to one embodiment of the present invention.
Figure 18B:
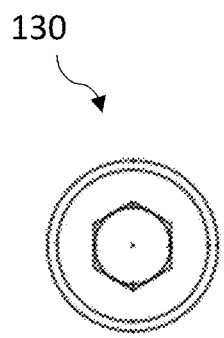
FIG. 18B illustrates a top view of the screw of the battery harvesting adapter according to one embodiment of the present invention as shown in FIG. 18A.
Figure 18C:
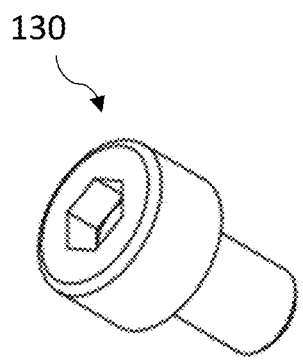
FIG. 18C illustrates a side perspective view of the screw of the battery harvesting adapter according to one embodiment of the present invention as shown in FIG. 18B.

FIGS. 18A-18C illustrate a screw 130 according to one embodiment of the present invention. FIG. 18A illustrates a side perspective view of a screw 130 of the battery harvesting adapter according to one embodiment of the present invention. FIG. 18B illustrates a top view of the screw 130 of the battery harvesting adapter according to one embodiment of the present invention as shown in FIG. 18A. FIG. 18C illustrates a side perspective view of the screw 130 of the battery harvesting adapter according to one embodiment of the present invention as shown in FIG. 18B. Preferably, in one embodiment, the screw 130 is used to attach the cover to the base of the battery harvesting adapter. In one embodiment, the screw is formed of stainless steel.

Figure 19A:
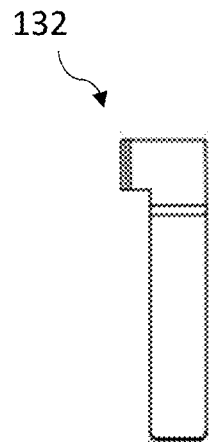
FIG. 19A illustrates a side view of a metal connector of a battery harvesting adapter according to one embodiment of the present invention.
Figure 19B:
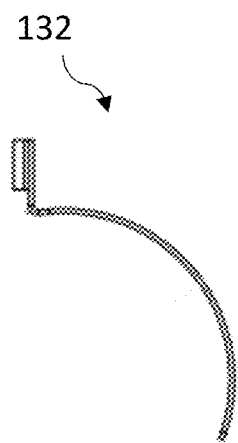
FIG. 19B illustrates a side view of the metal connector of the battery harvesting adapter according to one embodiment of the present invention as shown in FIG. 19A.
Figure 19C:
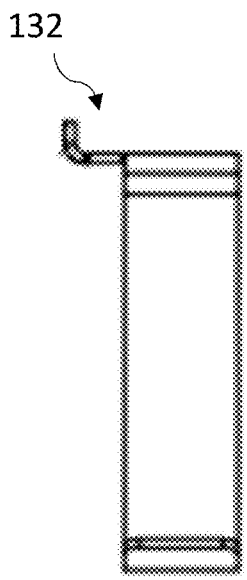
FIG. 19C illustrates a side view of the metal connector of the battery harvesting adapter according to one embodiment of the present invention as shown in FIG. 19B.
Figure 19D:
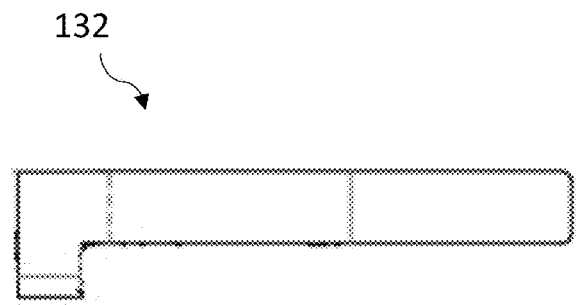
FIG. 19D illustrates a side view of the metal connector of the battery harvesting adapter according to one embodiment of the present invention as shown in FIG. 19C.

FIGS. 19A-19D illustrate various perspectives of a metal connector 132 of a battery harvesting adapter according to one embodiment of the present invention. FIG. 19A illustrates a side view of a metal connector 132 of a battery harvesting adapter according to one embodiment of the present invention. FIG. 19B illustrates a side view of the metal connector 132 of the battery harvesting adapter according to one embodiment of the present invention as shown in FIG. 19A. FIG. 19C illustrates a side view of the metal connector 132 of the battery harvesting adapter according to one embodiment of the present invention as shown in FIG. 19B. FIG. 19D illustrates a side view of the metal connector 132 of the battery harvesting adapter according to one embodiment of the present invention as shown in FIG. 19C. In one embodiment, the metal connector is formed of copper and/or nickel. In one embodiment, the metal connector has a high polish coating. The metal connector is operable to maintain a ground plane with the negative contact plate.

Figure 20:
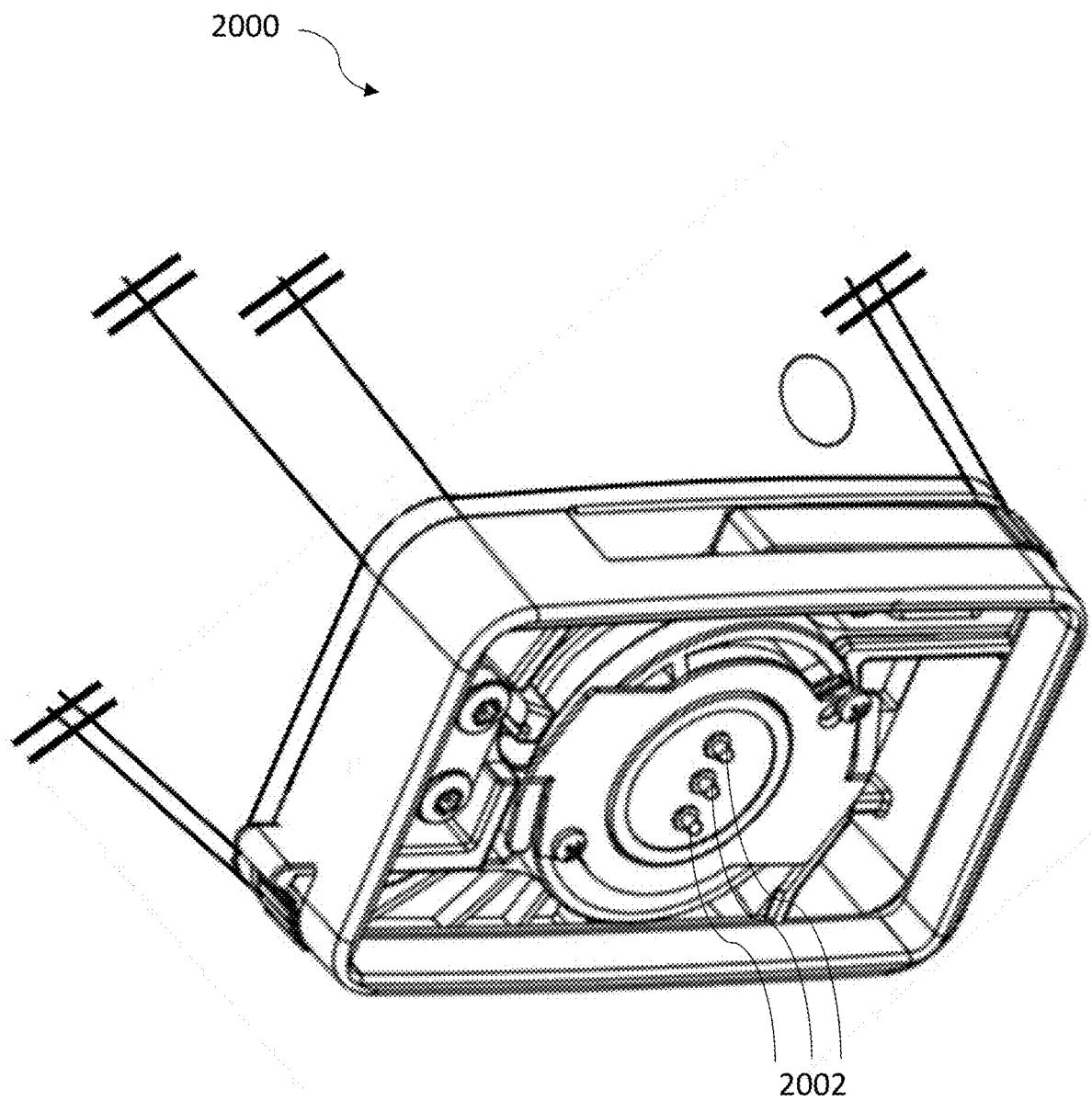
FIG. 20 illustrates one embodiment of the present invention installed as the bayonet connection on a military radio.

The present invention is not limited to use as a battery harvesting adapter. For example, the bayonet connection described herein is operable to be used on a military radio, a charging device (e.g., to charge at least one battery), a mesh network device (e.g., Link 16), and/or power tools (e.g., saw, drill, etc.). In one embodiment, the present invention includes a single arm instead of two arms. For example, but not limitation, the present invention includes a charger including multiple negative contact plates to engage multiple batteries. The charger includes a single arm for each negative contact plate to engage each battery on the charger. FIG. 20 illustrates one embodiment of the present invention installed as the bayonet connection on a radio 2000. The radio 2000 includes a plurality of input pins 2002 to receive power and/or data from a battery.

In one embodiment, the battery harvesting adaptor is operable to directly power at least one device (e.g., via the output connector). Alternatively, the connector of the battery harvesting adapter is operable to mate to a DC-DC converter. An example of a DC-DC converter is described in U.S. Pat. No. 10,950,988, which is incorporated herein by reference in its entirety.

Figure 21:
FIG. 21 illustrates a block diagram of one embodiment of the present invention used with a DC-DC conversion system.

FIG. 21 illustrates a block diagram of one embodiment of the present invention used with a DC-DC converter. A battery 2110 is attached to the battery harvesting adapter 100. The connector of the battery harvesting adapter 100 is connected to a DC-DC converter 2120 attached to an output cable 2130. The output cable 2130 is operable to power an output device 2140. The output device is preferably a battery (e.g., portable battery pack) or a power source (e.g., a portable power case). Alternatively, the output device is a radio, a laptop, a smartphone, or other electronic device. In one embodiment, the output cable is operable to provide a 17 V output, a 30 V output, a 12 V output, a 34 V output, and/or a 5V output.

In one example, the DC-DC converter is attached to an output cable having at least one 17V output connector. The 17V output connector is operable to provide power to a portable battery pack, a portable power case, and/or a rechargeable battery. Examples of a portable battery pack are described in U.S. Pat. Nos. 9,780,344, 10,461,289, and 10,531,590, and U.S. Patent Publication Nos. 20180258882, 20190109349, 20200099023, and 20200187379, each of which is incorporated herein by reference in its entirety. Examples of a portable power case are described in U.S. Pat. Nos. 11,025,075 and 11,025,076, and U.S. Patent Publication Nos. 20180062197 and 20190081493, each of which is incorporated herein by reference in its entirety.

As previously described, the at least one output device is preferably a battery or a power source (e.g., portable power case) rather than another type of electronic device (e.g., radio). Advantageously, charging a battery or a power source allows for maximum flexibility when using any other type of electronic device (e.g., radio). For example, if the DC-DC converter is used to charge a battery, the battery is operable to power a radio, a laser designator and/or rangefinder (e.g., a Special Operations Forces Laser Rangefinder Designator (SOFLAM)), a tablet, a smartphone, a satellite phone, a thermal imaging device, a laptop, or any other type of electronic device.

Figure 22:
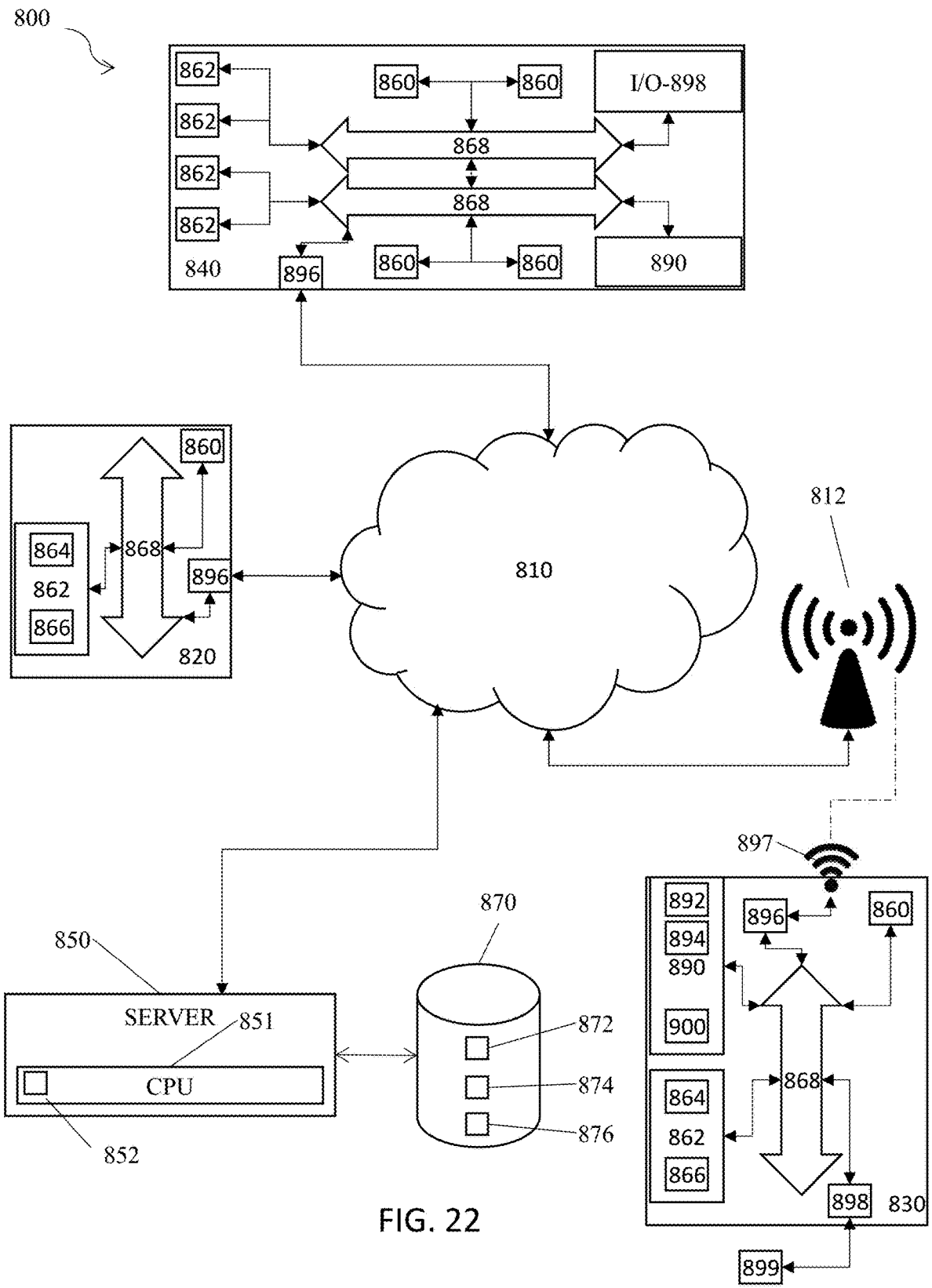
FIG. 22 is a schematic diagram of a system of the present invention.

FIG. 22 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 22, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 22, is operable to include other components that are not explicitly shown in FIG. 22, or is operable to utilize an architecture completely different than that shown in FIG. 22. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An apparatus operable to engage with a device comprising:
a housing;

at least one bayonet comprising at least one negative contact plate attached to the housing; and
a locking handle connected to the at least one negative contact plate;
wherein rotating the locking handle causes the at least one negative contact plate to rotate to engage the battery without rotating the housing and without rotating the battery;
wherein the at least one negative contact plate is constructed and configured to rotate within the housing to engage the device, wherein the at least one device includes a contact portion operable to contact the at least one negative contact plate; and
wherein the at least one negative contact plate is constructed and configured to contact the at least one device without rotating the housing and without rotating the device.

2. The apparatus of claim 1, wherein the device is a battery.

3. The apparatus of claim 1, wherein the apparatus is a battery harvesting adapter.

4. The apparatus of claim 1, wherein the apparatus is a radio.

5. The apparatus of claim 1, wherein the apparatus is a battery charger.

6. The apparatus of claim 1, wherein the device is stationary.

7. A bayonet connector comprising:
a bayonet comprising a negative contact plate and a locking handle connected to the negative contact plate;
wherein the negative contact plate is configured to contact a battery;
wherein the negative contact plate is constructed and configured to rotate to engage the battery;
wherein the negative contact plate is constructed and configured to contact the battery without rotating the battery; and
wherein the locking handle is constructed and configured to rotate to cause the negative contact plate to rotate to engage the battery without rotating the battery.

8. The bayonet connector of claim 7, wherein the battery is a portable radio communications (PRC)-148 radio battery, a PRC-152 radio battery, a PRC-161 radio battery, a PRC-163 radio battery, an ISR Transceiver battery, a SADL MicroLite (RT-1922) radio battery, a TacRover-E (TRE) radio battery, a Tactical ROVER-P (SIR 2.5) radio battery, a Coastal Defense MVR-IV video down link receiver battery, or a Persistent Systems Wave Relay MPU5 radio battery.

9. A battery harvesting adapter comprising:
a housing;
a channel in the housing constructed and configured to hold a cable;
at least one connector electrically connected to the cable;
at least one contact pin; and
a bayonet comprising a negative contact plate attached to the housing;
wherein the negative contact plate is operable to contact the battery;
wherein the at least one contact pin is operable to electrically connect to at least one battery contact;
wherein the negative contact plate is constructed and configured to rotate to engage the battery; and
wherein the at least one connector is operable to supply power to at least one device.

10. The battery harvesting adapter of claim 9, wherein a coil spring is provided around the cable, wherein the cable and the coil spring are held securely in the channel in the housing such that a portion of the coil spring is positioned inside the housing and a portion of the coil spring is positioned outside the housing.

11. The battery harvesting adapter of claim 9, wherein the battery is a portable radio communications (PRC)-148 radio battery, a PRC-152 radio battery, a PRC-161 radio battery, a PRC-163 radio battery, an ISR Transceiver battery, a SADL MicroLite (RT-1922) radio battery, a TacRover-E (TRE) radio battery, a Tactical ROVER-P (SIR 2.5) radio battery, a Coastal Defense MVR-IV video down link receiver battery, or a Persistent Systems Wave Relay MPU5 radio battery.

12. The battery harvesting adapter of claim 9, further including at least one direct current-direct current (DC-DC) converter.

13. The battery harvesting adapter of claim 9, further including a locking handle connected to the negative contact plate, wherein rotating the locking handle causes the negative contact plate to rotate to engage the battery without rotating the housing and without rotating the battery.

14. The battery harvesting adapter of claim 13, further including a cable locker constructed and configured to provide slack for the cable to turn and move when the locking handle is rotated.

15. The battery harvesting adapter of claim 9, wherein the at least one device is a battery, a radio, a portable power case, and/or a direct current-direct current (DC-DC) converter.

16. The battery harvesting adapter of claim 9, wherein the negative contact plate comprises copper and/or nickel.

17. The battery harvesting adapter of claim 9, wherein the at least one connector has an ingress protection (IP) rating of IPX6, IPX7, or IPX8.

18. The battery harvesting adapter of claim 9, wherein the housing comprises acrylonitrile butadiene styrene (ABS), nylon, aluminum, carbon fiber, glass fiber, polyamide, and/or polycarbonate.

19. The battery harvesting adapter of claim 9, wherein the at least one contact pin comprises brass, stainless steel, and/or gold.

* * * * *